(12) United States Patent
Isobe et al.

(10) Patent No.: US 9,330,854 B2
(45) Date of Patent: May 3, 2016

(54) DYE-SENSITIZED SOLAR CELL AND PROCESS OF MANUFACTURING SAME, DYE-SENSITIZED SOLAR CELL MODULE AND PROCESS OF MANUFACTURING SAME

(71) Applicant: FUJIKURA LTD., Koto-ku, Tokyo (JP)

(72) Inventors: Yoshiyasu Isobe, Tokyo (JP); Hiroshi Matsui, Tokyo (JP); Kenichi Okada, Chiba (JP); Kazuhiro Yamamoto, Chiba (JP)

(73) Assignee: FUJIKURA LTD., Tokyo (JP)

( * ) Notice: Subject to any disclaimer, the term of this patent is extended or adjusted under 35 U.S.C. 154(b) by 389 days.

(21) Appl. No.: 14/015,094

(22) Filed: Aug. 30, 2013

(65) Prior Publication Data
US 2014/0000677 A1    Jan. 2, 2014

Related U.S. Application Data

(63) Continuation of application No. PCT/JP2012/054861, filed on Feb. 28, 2012.

(30) Foreign Application Priority Data

Mar. 2, 2011  (JP) ................ 2011-044674
Mar. 2, 2011  (JP) ................ 2011-044675
Mar. 2, 2011  (JP) ................ 2011-044677

(51) Int. Cl.
*H01G 9/20*  (2006.01)

(52) U.S. Cl.
CPC ........... *H01G 9/2081* (2013.01); *H01G 9/2077* (2013.01); *H01G 9/2031* (2013.01); *H01G 9/2059* (2013.01); *Y02E 10/542* (2013.01); *Y02P 70/521* (2015.11)

(58) Field of Classification Search
CPC . H01G 9/2081; H01G 9/2077; H01G 9/2031; H01G 9/2059; Y02P 70/521; Y02E 10/542
See application file for complete search history.

(56) References Cited

U.S. PATENT DOCUMENTS

| 4,340,803 A | 7/1982 | Coyle |
| 8,217,403 B1 * | 7/2012 | Sekine .................. H05K 1/097 257/79 |

(Continued)

FOREIGN PATENT DOCUMENTS

| CN | 1731591 A | 2/2006 |
| CN | 1737591 | 2/2006 |

(Continued)

OTHER PUBLICATIONS

Japanese Office Action issued Oct. 7, 2014 is Japanese Patent Application No. 2011-044677.

(Continued)

*Primary Examiner* — Susan D Leong
(74) *Attorney, Agent, or Firm* — Sughrue Mion, PLLC

(57) ABSTRACT

A method for producing a dye-sensitized solar cell includes: preparing a first electrode comprising a transparent substrate and a transparent conductive film, and a second electrode comprising a metal substrate that is formed of a metal capable of forming a passivation film; forming an oxide semiconductor layer on the first electrode; supporting a photosensitized dye on the oxide semiconductor layer; disposing an electrolyte on the oxide semiconductor layer; facing the first electrode and the second electrode, and sealing the electrolyte by a sealing section; and fixing a connection member formed of a metal having lower resistance than the metal substrate, onto the surface of the metal substrate, with the surface being on the opposite side of the first electrode, in which method in fixing the connection member, the connection member is bonded to the metal substrate by resistance welding, and thereby the connection member is fixed onto the metal substrate.

5 Claims, 17 Drawing Sheets

(56) References Cited

U.S. PATENT DOCUMENTS

| | | |
|---|---|---|
| 2006/0038525 A1 | 2/2006 | Kishida |
| 2010/0108135 A1 | 5/2010 | Morooka et al. |
| 2011/0088745 A1* | 4/2011 | Usui .................... H01G 9/2081 136/244 |
| 2011/0088772 A1 | 4/2011 | Usui |
| 2011/0088773 A1 | 4/2011 | Usui |

FOREIGN PATENT DOCUMENTS

| | | |
|---|---|---|
| EP | 2 276 101 A1 | 1/2011 |
| EP | 2 276 102 A1 | 1/2011 |
| EP | 2 276 105 A1 | 1/2011 |
| EP | 2 287 961 A1 | 2/2011 |
| JP | 07-099334 | 4/1995 |
| JP | 07-202241 | 8/1995 |
| JP | 2004-303607 A | 10/2004 |
| JP | 2006-49268 A | 2/2006 |
| JP | 2007-42526 A | 2/2007 |
| JP | 2009-187691 A | 8/2009 |
| JP | 2009-187768 A | 8/2009 |
| JP | 2009-289735 A | 12/2009 |
| JP | 2009-289736 A | 12/2009 |
| JP | 2009-289737 A | 12/2009 |
| KR | 10-2006-0012786 A | 2/2006 |
| WO | 2009/097588 A2 | 8/2009 |
| WO | 2009/133688 A1 | 11/2009 |
| WO | 2009/133689 A1 | 11/2009 |
| WO | 2009/141964 A1 | 11/2009 |
| WO | 2009/144949 A1 | 12/2009 |

OTHER PUBLICATIONS

Supplementary European Search Report issued Aug. 4, 2014 in European Application No. 12752945.1.

Chinese Office Action issued Nov. 15, 2014 in Chinese Patent Application No. 201280003962.1.

\* cited by examiner

DYE-SENSITIZED SOLAR CELL AND PROCESS OF MANUFACTURING SAME, DYE-SENSITIZED SOLAR CELL MODULE AND PROCESS OF MANUFACTURING SAME

CROSS REFERENCE TO RELATED APPLICATIONS

This application is a Continuation of National Stage of International Application No. PCT/JP2012/054861 filed Feb. 28, 2012, claiming priority based on Japanese Patent Applications No. 2011-044674 filed Mar. 2, 2011, No. 2011-044675 filed Mar. 2, 2011 and No. 2011-044677 filed Mar. 2, 2011, the contents of all of which are incorporated herein by reference in their entirety.

TECHNICAL FIELD

The present invention relates to a dye-sensitized solar cell, a method for producing the solar cell, a dye-sensitized solar cell module, and a method for producing the solar cell module.

BACKGROUND ART

A dye-sensitized solar cell module includes plural dye-sensitized solar cells that are electrically connected in series. Each dye-sensitized solar cell includes a working electrode, a counter electrode that faces the working electrode, and a sealing section that bonds these electrodes. The working electrode includes a transparent substrate, a transparent conductive film formed thereon, and an oxide semiconductor layer provided on the transparent conductive film.

In such a dye-sensitized solar cell module, as a method for connecting plural dye-sensitized solar cells in series, the method described in Patent Document 1 has been hitherto known. In the method described in Patent Document 1, a connection terminal formed of copper or nickel for connection to another dye-sensitized solar cell is bonded to a region in a titanium counter electrode, which region is at the surface on the opposite side of the working electrode and is on the outer side of the outer periphery of the sealing section, and also, a connection terminal is also bonded onto the transparent conductive film of an adjoining dye-sensitized solar cell. Thus, these connection terminals are connected to each other through conductive wires. Further, Patent Document 1 describes, as a method of bonding a connection terminal formed of copper or nickel to a titanium counter electrode, a method of bonding the connection terminal to the titanium counter electrode by applying ultrasonic wave to the connection terminal while pressing the titanium counter electrode by means of the connection terminal. Meanwhile, the connection terminal is bonded to the surface of the titanium counter electrode on the opposite side of the working electrode, in order to inject the electrons coming from an adjoining dye-sensitized solar cell or from an external source to the electrolyte through the titanium counter electrode.

Furthermore, as a dye-sensitized solar cell module such as described above, for example, the solar cell module described in Patent Document 2 as described below is known. Patent Document 2 as described below discloses a dye-sensitized solar cell module in which, in two adjoining dye-sensitized solar cells, an edge of the counter electrode of one of the dye-sensitized solar cells and the transparent conductive film of the other dye-sensitized solar cell are connected directly or through a conductive member such as solder or a conductive paste, in between adjoining sealing sections.

PRIOR ART DOCUMENTS

Patent Documents

Patent Document 1: WO 2009/133689
Patent Document 2: WO 2009/144949

SUMMARY OF INVENTION

Problem to be Solved by the Invention

However, the method described in Patent Document 1 has the following problem.

That is, in the method described in Patent Document 1, a connection terminal formed of copper or nickel is bonded to a region in the titanium counter electrode, which region is at the surface on the opposite side of the working electrode and is on the outer side of the outer periphery of the sealing section. Therefore, the terminal must be bonded to a very small space in the titanium counter electrode, and the bonding strength cannot be said to be necessarily sufficient. Therefore, a dye-sensitized solar cell module having this dye-sensitized solar cell has room for an improvement in terms of connection reliability.

In order to increase the connection reliability, it is contemplated to provide a connection terminal in a region that is inner to the outer periphery of the sealing section and on the opposite side of the working electrode, within the surface of the titanium counter electrode, that is, an immediately upper section of the oxide semiconductor layer.

However, in that case, since the connection point of the connection terminal comes closer to the oxide semiconductor layer, there is a risk that the photosensitized dye supported on the oxide semiconductor layer may deteriorate.

Thus, there has been a demand for a method for producing a dye-sensitized solar cell which has excellent connection reliability while suppressing deterioration of the photosensitized dye.

On the other hand, in the dye-sensitized solar cell, since electricity can be directly extracted from the back surface, it is preferable to use a metal in the counter electrode. However, there are some metals which do not have corrosion resistance against iodine and the like that are contained in electrolytes. For this reason, it is necessary to use a metal having a highly corrosion resistant passivation film as a metal for the counter electrode in a dye-sensitized solar cell.

However, in the case of using a metal having a highly corrosion resistant passivation film as the metal for the counter electrode, the method for producing a dye-sensitized solar cell module described in Patent Document 2 has a problem disclosed below.

That is, in the case of using a metal having a highly corrosion resistant passivation film as the metal for the counter electrode, when it is attempted to connect a solder or a conductive paste with the counter electrode, the solder or conductive paste and the counter electrode do not adhere to each other due to the passivation film of the counter electrode, or even if they adhere to each other, the contact resistance is high, and the connection reliability or conductive property is not sufficient. Also, even if the state of passivation may not be achieved, a metal necessarily undergoes formation of a thin oxide film on the surface; therefore, even when a metal which does not form a passivation film is used, the contact resistance is high, and also, the adhesive power is not sufficient.

Furthermore, in the case of using a solder or a conductive paste, since the connection terminal must be adhered to the counter electrode by applying heat and melting, there is a risk that depending on the heating temperature, the photosensitized dye supported on the porous oxide semiconductor layer may deteriorate.

Therefore, there has been a demand for a method for producing a dye-sensitized solar cell module which has excellent conductive property and connection reliability and has deterioration of the photosensitized dye sufficiently suppressed.

On the other hand, in a dye-sensitized solar cell module, both an enhancement of the aperture ratio and the connection reliability of adjoining dye-sensitized solar cells become important.

However, the dye-sensitized solar cell module described in Patent Document 2 has a problem disclosed below.

That is, in the dye-sensitized solar cell module described in Patent Document 2, when an edge of the counter electrode of one of two adjoining dye-sensitized solar cells, which is on the side of the other dye-sensitized solar cell, is entirely connected to the working electrode of the other dye-sensitized solar cell, the bonding strength can be increased by widening the width of the connection point. However, since the connection point is between adjoining sealing sections, that is, within the light-receiving area, the solar cell module cannot contribute to power generation as much as the portion of the area of the connection point, and the aperture ratio is decreased.

On the other hand, when the width of the connection point is decreased, the aperture ratio can be increased, but the bonding strength is decreased.

Therefore, the dye-sensitized solar cell module described in Patent Document 2 has room for an improvement in terms of an increase in the aperture ratio and of connection reliability.

Thus, a first object of the present invention is to provide a dye-sensitized solar cell which has excellent connection reliability while suppressing deterioration of a photosensitized dye, a method for producing the solar cell, a dye-sensitized solar cell module, and a method for producing the solar cell module.

Furthermore, a second object of the present invention is to provide a method for producing a dye-sensitized solar cell module, the method being capable of producing a dye-sensitized solar cell module which has excellent conductive property and connection reliability and has deterioration of a photosensitized dye sufficiently suppressed, and a dye-sensitized solar cell module.

Furthermore, a third object of the present invention is to provide a dye-sensitized solar cell module which has excellent connection reliability while having a sufficiently high aperture ratio.

Means for Solving Problem

The inventors of the present invention conducted thorough investigations in order to achieve the first object described above, and as a result, the inventors found that the first object can be achieved by the following invention.

That is, the present invention is a method for producing a dye-sensitized solar cell, the method including a preparation step of preparing a first electrode that includes a transparent substrate and a transparent conductive film provided on the transparent substrate, and a second electrode that includes a metal substrate formed from a metal capable of forming a passivation film; an oxide semiconductor layer formation step of forming an oxide semiconductor layer on the first electrode or the second electrode; a dye supporting step of supporting a photosensitized dye on the oxide semiconductor layer; an electrolyte disposition step of disposing an electrolyte on the oxide semiconductor layer; a sealing step of arranging the first electrode and the second electrode to face each other and sealing the electrolyte by means of a sealing section; and a connection member fixation step of fixing a connection member formed of a metal having a lower resistance than the metal substrate, to a position that is on the metal substrate of the second electrode and is on the opposite side of the first electrode, wherein in the connection member fixation step, the connection member is fixed onto the metal substrate by bonding the connection member to the metal substrate by resistance welding.

According to this production method, in the connection member fixation step, a connection member having a lower resistance than a metal substrate is bonded to the metal substrate by resistance welding, and thereby the connection member is fixed onto the metal substrate. Here, resistance welding is a method of pressing two electrodes onto the connection member and the metal substrate or any one of them, passing an electric current between the two to thereby generate heat at the contact area between the connection member and the metal substrate, melting both the connection member and the metal substrate by means of this heat, and thereby connecting the two parts. At this time, heat is generated only at the contact area between the metal substrate and the connection member. Also, in regard to resistance welding, since the time for passing an electric current is usually a short time (several milliseconds (ms)), the duration of heat generation is also short. Therefore, the space at which heat is applied can be restricted to a localized region. Accordingly, even in the case of fixing a connection member to the metal substrate of the second electrode after the sealing step, deterioration of the photosensitized dye supported on the oxide semiconductor layer can be sufficiently suppressed.

Furthermore, since the metal substrate and the connection member are bonded by melting them through the connection member fixation step, an alloy section is formed between the two members. Therefore, the bonding strength between the metal substrate and the connection member becomes large, and thus a dye-sensitized solar cell having excellent connection reliability can be obtained. Furthermore, when a dye-sensitized solar cell module is produced by connecting in series or in parallel a plural number of dye-sensitized solar cells thus obtained, a dye-sensitized solar cell module having excellent connection reliability can be obtained. Furthermore, a dye-sensitized solar cell module which has excellent connection reliability even with an external circuit can be obtained. Also, since an alloy section is provided between the second electrode and the connection member, the contact resistance between the second electrode and the connection member can also be decreased. Furthermore, in the production method of the present invention, when the connection member is bonded to the metal substrate by resistance welding, the space at which heat is applied can be restricted to a localized region. Therefore, the connection member can also be fixed to an inner region of the sealing section. In this case, the distance between the connection member and the electrolyte, over which an electric current passes through the metal substrate that has a higher resistance than the connection member, can be shortened, and thus the resistance between the connection member and the electrolyte can be decreased.

In the connection member fixation step, it is preferable to carry out resistance welding by bringing, while having the connection member brought into contact with the surface of the metal substrate on the opposite side of the first electrode, two electrodes for resistance welding respectively into direct contact with the connection member and the aforementioned surface of the metal substrate.

In this case, when the second electrode and the connection member are connected by resistance welding, welding is terminated without pressing the two electrodes for resistance welding against the surface on the first electrode side of the metal substrate of the second electrode. Therefore, deformation in the surface on the first electrode side of the metal substrate can be sufficiently prevented. Furthermore, there is also an advantage that adhesion of the electrode for resistance welding to the surface on the first electrode side of the metal substrate of the second electrode can be prevented.

In the connection member fixation step, it is preferable to perform resistance welding for 1 ms to 20 ms.

In this case, the thickness of the alloy section is appropriately adjusted, and both the bonding strength and resistance are further improved between the connection member and the metal substrate.

Furthermore, the present invention is a method for producing a dye-sensitized solar cell module having a dye-sensitized solar cell module unit which includes plural dye-sensitized solar cells that are electrically connected in series, the method including a preparation step of preparing the plural dye-sensitized solar cells; and a connection step of electrically connecting the plural dye-sensitized solar cells in series and thereby producing the dye-sensitized solar cell module unit, wherein in the preparation step, at least a part of the dye-sensitized solar cells among the plural dye-sensitized solar cells are prepared by the method for producing a dye-sensitized solar cell described above, the dye-sensitized solar cell further includes a terminal section provided on the first electrode, one transparent substrate is used in common as the transparent substrate for the plural dye-sensitized solar cells, and in the connection step, the second electrode of any one dye-sensitized solar cell between two adjoining dye-sensitized solar cells and the terminal section provided on the first electrode of the other dye-sensitized solar cell are connected by resistance welding.

According to this production method, as at least a part of the plural dye-sensitized solar cells are produced by the method for producing a dye-sensitized solar cell described above, deterioration of the photosensitized dye is sufficiently suppressed, and dye-sensitized solar cells having excellent connection reliability are obtained. Furthermore, according to the production method described above, in the connection step, the second electrode of any one dye-sensitized solar cell between two adjoining dye-sensitized solar cells and a terminal section provided on the first electrode of the other dye-sensitized solar cell are connected by resistance welding. Here, resistance welding is a method of pressing two electrodes onto the second electrode and the terminal section or any one of them, passing an electric current between the two to thereby generate heat at the contact area between the second electrode and the terminal section, melting both the second electrode and the terminal section by means of this heat, and thereby connecting the two parts. At this time, heat is generated only at the contact area between the metal substrate and the terminal section. Also, in regard to resistance welding, since the time for passing an electric current is usually a short time (several milliseconds (ms)), the duration of heat generation is also short. Therefore, the space at which heat is applied can be restricted to a localized region. Accordingly, even in the case of connecting the second electrode to the terminal section after the sealing step, deterioration of the photosensitized dye supported on the oxide semiconductor layer can be sufficiently suppressed.

Furthermore, since the second electrode and the terminal section are bonded by melting through the connection step, an alloy section is formed between the two parts. Therefore, the bonding strength between the metal substrate and the terminal section becomes large, and when plural dye-sensitized solar cells thus obtained are connected in series, a dye-sensitized solar cell module having excellent connection reliability can be obtained. Furthermore, as an alloy section is provided between the second electrode and the terminal section, the contact resistance between the second electrode and the terminal section can also be decreased. Accordingly, the dye-sensitized solar cell module thus obtained also acquires excellent conductive property.

In the connection step, it is preferable to carry out the resistance welding by bringing, while having the second electrode brought into contact with the top of the terminal section, two electrodes for resistance welding respectively into direct contact with the surface of the metal substrate of the second electrode, which surface is on the opposite side of the first electrode.

In this case, when the second electrode and the terminal section are connected by resistance welding, welding is terminated without pressing the two electrodes for resistance welding against the terminal section and the surface on the first electrode side of the metal substrate of the second electrode. Therefore, there is obtained an advantage that any impurities caused by the adhesion of the electrode for resistance welding can be prevented from remaining on the surface on the first electrode side of the metal substrate of the second electrode. Furthermore, since welding is terminated without pressing the electrode for resistance welding against the terminal section, the space required for welding can be reduced.

Furthermore, the present invention is a method for producing a dye-sensitized solar cell module in which plural dye-sensitized solar cells are electrically connected in series, the method including a connection step of electrically connecting the plural dye-sensitized solar cells in series, wherein the dye-sensitized solar cell is produced by the method for producing a dye-sensitized solar cell described above, and in the connection step, the connection member provided on the second electrode of any one dye-sensitized solar cell between two adjoining dye-sensitized solar cells and a terminal section provided on the first electrode of the other dye-sensitized solar cell are connected.

According to this production method, as the dye-sensitized solar cell is produced by the method for producing a dye-sensitized solar cell described above, a dye-sensitized solar cell which has deterioration of the photosensitized dye sufficiently suppressed and has excellent connection reliability is obtained. Therefore, when the metal substrate of the second electrode and the terminal section provided on the first electrode of an adjoining dye-sensitized solar cell are connected in the connection step, a dye-sensitized solar cell module having excellent photoelectric conversion characteristics and excellent connection reliability can be obtained.

In the connection step, it is preferable to carry out the resistance welding by bringing, while having the connection member brought into contact with the top of the terminal section, two electrodes for resistance welding into direct contact with the surface of the connection member.

In this case, when the connection member and the terminal section are connected by resistance welding, welding is terminated without pressing the two electrodes for resistance welding against the terminal section. Therefore, the space required for welding can be reduced.

In the connection step, it is preferable to carry out the resistance welding for 1 ms to 20 ms.

In this case, the connection strength between the second electrode or the connection member and the terminal section can be more sufficiently enhanced, the thickness of the alloy section is also appropriately adjusted, and the resistance between the terminal section and the metal substrate of the second electrode or the connection member can be more sufficiently decreased.

Furthermore, the present invention is a dye-sensitized solar cell including a first electrode which includes a transparent substrate and a transparent conductive film provided on the transparent substrate; a second electrode that faces the first electrode and includes a metal substrate formed of a metal capable of forming a passivation film; an oxide semiconductor layer that is provided on the first electrode or the second electrode; an electrolyte that is provided between the first electrode and the second electrode; a sealing section that joins the first electrode and the second electrode; and a connection member that is provided on the surface of the second electrode on the opposite side of the first electrode and is formed of a metal having lower resistance than the metal that constitutes the metal substrate, in which solar cell an alloy section formed from an alloy of the metal that constitutes the metal substrate and the metal that constitutes the connection member is provided between the second electrode and the connection member.

According to this invention, since an alloy section formed from an alloy of the metal of the second electrode and the metal that constitutes the connection member is provided between the second electrode and the connection member, the connection strength between the second electrode and the connection member becomes large, and excellent connection reliability is obtained. Furthermore, as an alloy section is provided between the second electrode and the connection member, the contact resistance between the second electrode and the connection member can also be decreased.

In the dye-sensitized solar cell, it is preferable that the connection member be provided at an area that faces the electrolyte in the second metal.

In this case, the distance in which an electric current passes through the metal substrate having higher resistance than the connection member between the connection member and the electrolyte can be shortened, and thus the resistance between the connection member and the electrolyte can be decreased.

Furthermore, the present invention provides a dye-sensitized solar cell module having a dye-sensitized solar cell module unit which includes plural dye-sensitized solar cells that are electrically connected in series, in which module at least a part of the dye-sensitized solar cells among the plural dye-sensitized solar cells are composed of the dye-sensitized solar cells described above; the dye-sensitized solar cell further includes a terminal section provided on the first electrode; one transparent substrate is used in common as the transparent substrate in the plural dye-sensitized solar cells; the metal substrate of the second electrode of any one dye-sensitized solar cell of two adjoining dye-sensitized solar cells and the terminal section provided on the first electrode of the other dye-sensitized solar cell are directly connected; the area in the terminal section that is connected to the metal substrate is formed of a metal having lower resistance than the metal substrate of the second electrode; and an alloy section formed of an alloy of the metal that constitutes the metal substrate and the metal that constitutes the area in the terminal section that is in contact with the metal substrate is provided between the terminal section and the second electrode.

According to this invention, since at least a part of the plural dye-sensitized solar cells are composed of the dye-sensitized solar cell described above, the connection strength between the second electrode and the connection member becomes large, and excellent connection reliability is obtained. Furthermore, as an alloy section is provided between the second electrode and the connection member, the contact resistance between the second electrode and the connection member can also be decreased. Furthermore, since an alloy section formed from an alloy of the metal that constitutes the metal substrate in the second electrode and the metal that constitutes the area in the terminal section that is in contact with the metal substrate, is provided between the metal substrate of the second electrode and the terminal section, the connection strength between the second electrode and the terminal section becomes large, and excellent connection reliability is obtained. Furthermore, since an alloy section is provided between the metal substrate of the second electrode and the terminal section, the contact resistance between the metal substrate of the second electrode and the terminal section can also be decreased.

Furthermore, the present invention may also be a dye-sensitized solar cell module including a dye-sensitized solar cell module unit which includes plural dye-sensitized solar cells that are electrically connected in series, in which module at least a part of the dye-sensitized solar cells among the plural dye-sensitized solar cells are composed of the dye-sensitized solar cells described above; the dye-sensitized solar cell further includes a terminal section provided on the first electrode; one transparent substrate is used in common as the transparent substrate in the plural dye-sensitized solar cells; the connection member fixed to the second electrode of any one dye-sensitized solar cell of two adjoining dye-sensitized solar cells and the terminal section provided on the first electrode of the other dye-sensitized solar cell are directly connected; and an alloy section formed from an alloy of the metal that constitutes the terminal section and the metal that constitutes the connection member is provided between the terminal section and the connection member.

According to this invention, since at least a part of the among the plural dye-sensitized solar cells are composed of the dye-sensitized solar cell described above, the connection strength between the second electrode and the connection member becomes large, and excellent connection reliability is obtained. Furthermore, as an alloy section is provided between the second electrode and the connection member, the contact resistance between the second electrode and the connection member can also be decreased. Furthermore, since an alloy section formed from an alloy of the metal that constitutes the connection member fixed to the second electrode and the metal that constitutes the terminal section is provided between the connection member fixed to the second electrode and the terminal section, the connection strength between the second electrode and the terminal section becomes large, and excellent connection reliability is obtained. Furthermore, since the alloy section is provided between the connection member of the second electrode and the terminal section, the contact resistance between the second electrode and the terminal section can be decreased.

Furthermore, the present invention is a dye-sensitized solar cell module including a dye-sensitized solar cell module unit which includes plural dye-sensitized solar cells that are electrically connected in series, in which module at least a part of the dye-sensitized solar cells among the plural dye-sensitized solar cells are composed of the dye-sensitized solar cell described above; one transparent substrate is used in common as the transparent substrate in the plural dye-sensitized solar cells; the plural dye-sensitized solar cells each include a first electrode section including the first electrode and a second electrode section including the second electrode; a concave section is provided on the outer side of the sealing section; one electrode section between the first electrode section and the second electrode section in any one dye-sensitized solar cell between two adjoining dye-sensitized solar cells includes a main body section, and at least one protruding section that is in conduction with the main body section and protrudes from a portion of the edge on the side of the other dye-sensitized solar cell in the main body section; and the protruding section is bonded to the other electrode section between the first electrode section and the second electrode section in the other dye-sensitized solar cell, at the concave section of the other dye-sensitized solar cell. Here, when the "one electrode section between the first electrode section and the second electrode section" is the first electrode section, the "other electrode section between the first electrode section and the second electrode section" means the second electrode section. On the contrary, when the "one electrode section between the first electrode section and the second electrode section" is the second electrode section, the "other electrode section between the first electrode section and the second electrode section" means the first electrode section. Furthermore, it is acceptable as long as the first electrode section includes the first electrode section, and the first electrode section may be composed of the first electrode section only, or may be composed of the first electrode and a terminal section provided at the first electrode. Furthermore, it is acceptable as long as the second electrode section includes the second electrode, and the second electrode section may be composed of the second electrode section only, or may be composed of the second electrode and a connection member provided at the second electrode.

According to this dye-sensitized solar cell module, since at least a part of the plural dye-sensitized solar cells are composed of the dye-sensitized solar cell described above, the connection strength between the second electrode and the connection member becomes large, and excellent connection reliability is obtained. Furthermore, as an alloy section is provided between the second electrode and the connection member, the contact resistance between the second electrode and the connection member can also be decreased. Furthermore, the protruding section protrudes from only a portion of the edge on the other dye-sensitized solar cell side of the main body section in one dye-sensitized solar cell between two adjoining dye-sensitized solar cells, and this protruding section is bonded to the other electrode section between the first electrode section and the second electrode section in the other dye-sensitized solar cell, at the concave section of the other dye-sensitized solar cell. Accordingly, the area of the connection point between the protruding section and the other electrode section between the first electrode section and the second electrode section of the other dye-sensitized solar cell can be made sufficiently large without significantly decreasing the aperture ratio. Therefore, the dye-sensitized solar cell module of the present invention has excellent connection reliability.

Thus, the dye-sensitized solar cell module of the present invention has excellent connection reliability by having a protruding section that protrudes from only a portion of the edge on the other dye-sensitized solar cell side in the main body section, bonded to the other electrode section between the first electrode section and the second electrode section of the other dye-sensitized solar cell. For this reason, there is no need to provide a protruding section in the remaining part of the edge on the other dye-sensitized solar cell side of the main body section. Therefore, the connection point for connecting the protruding section of the remaining part and the other electrode section between the first electrode section and the second electrode section in the other dye-sensitized solar cell can be omitted, and the aperture ratio can be increased. Particularly, in the dye-sensitized solar cell module, the protruding section of an electrode section of one dye-sensitized solar cell and the other electrode section between the first electrode section and the second electrode section of the other dye-sensitized solar cell are connected at the concave section provided on the outside of the sealing section of the other dye-sensitized solar cell. Therefore, the gap between the main body sections of two adjoining dye-sensitized solar cells can be made small. That is, the area of the region that does not contribute to power generation can be made small. Therefore, according to the dye-sensitized solar cell module, the aperture ratio can be made higher as compared with the case where the area where the protruding section and the other electrode section between the first electrode section and the second electrode section in the other dye-sensitized solar cell are connected, is provided on the outside of the concave section of the other dye-sensitized solar cell.

Meanwhile, in order to achieve the second object described above, in the method for producing the dye-sensitized solar cell module including a dye-sensitized solar cell module unit described above, when at least a part of the dye-sensitized solar cells among the plural dye-sensitized solar cells are produced, it is not necessarily required that a connection member formed of a metal having lower resistance than the metal substrate be fixed to the surface that is on the metal substrate of the second electrode and on the opposite side of the first electrode.

Furthermore, in order to achieve the third object described above, in the dye-sensitized solar cell module including a dye-sensitized solar cell module unit described above, it is not necessarily required that at least a part of the dye-sensitized solar cells among the plural dye-sensitized solar cells include a connection member formed of a metal having lower resistance than the metal that constitutes the metal substrate, on the surface of the second electrode on the opposite side of the first electrode; and that an alloy section formed from an alloy of the metal that constitutes the metal substrate and the metal that constitutes the connection member be provided between the second electrode and the connection member.

Meanwhile, in the present invention, the terminal section includes, for example, a current collector wiring, an insert material, a terminal, or a laminate between a current collector wiring and an insert material.

Effect of the Invention

According to the present invention, there are provided a dye-sensitized solar cell which has deterioration of the photosensitized dye sufficiently suppressed and has excellent connection reliability, a method for producing the solar cell, a dye-sensitized solar cell module, and a method for producing the solar cell module.

MODE(S) FOR CARRYING OUT THE INVENTION

Hereinafter, embodiments of the present invention will be described in detail with reference to the attached drawings.

<First Embodiment>

Figure 1:
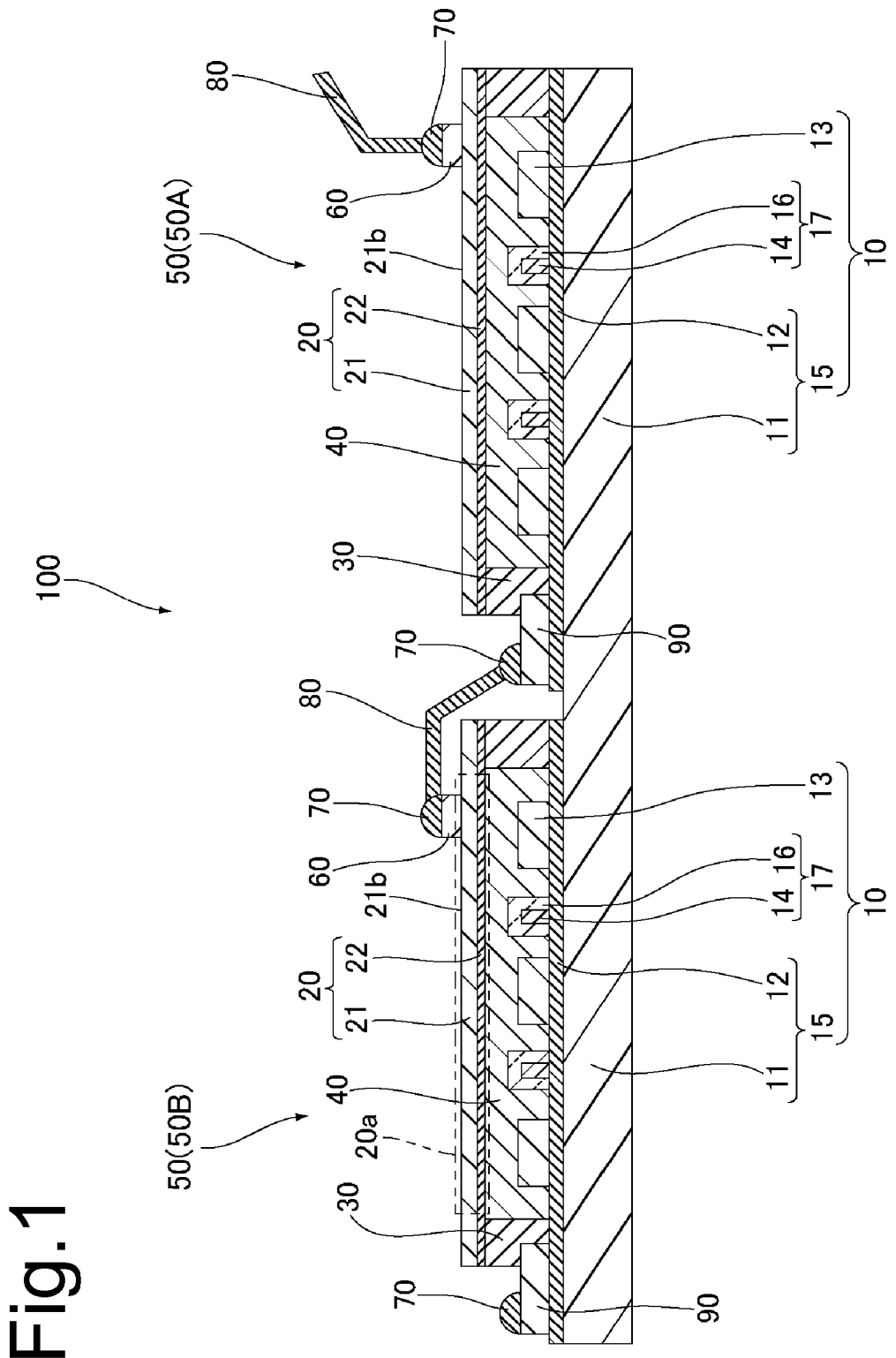
FIG. 1 is a cross-sectional view illustrating a first embodiment of the dye-sensitized solar cell module of the present invention.

First, a first embodiment of the dye-sensitized solar cell module of the present invention will be described using FIG. 1. FIG. 1 is a cross-sectional diagram illustrating the first embodiment of the dye-sensitized solar cell module of the present invention.

As illustrated in FIG. 1, a dye-sensitized solar cell module 100 includes plural (two in FIG. 1) dye-sensitized solar cells 50, and the plural dye-sensitized solar cells 50 are electrically connected in series. Hereinafter, for the convenience of explanation, two adjoining dye-sensitized solar cells 50 in the dye-sensitized solar cell module 100 may be referred to as dye-sensitized solar cells 50A and 50B.

First, the dye-sensitized solar cell 50A will be described.

The dye-sensitized solar cell 50A includes a working electrode 10; a counter electrode 20 that faces the working electrode 10; a sealing section 30 that bonds the working electrode 10 and the counter electrode 20; and an electrolyte 40 that is filled in the cell space formed by the working electrode 10, the counter electrode 20, and the annular sealing section 30.

The working electrode 10 includes a transparent conductive substrate 15 composed of a transparent substrate 11 and a transparent conductive film 12 that is provided on the transparent substrate 11; an oxide semiconductor layer 13 that is provided on the transparent conductive film 12 of the transparent conductive substrate 15; and a wiring section 17 that is provided on the transparent conductive film 12 so as to surround each porous oxide semiconductor layer (hereinafter, simply referred to as "oxide semiconductor layer"). The wiring section 17 includes a current collector wiring 14 that is provided on the transparent conductive film 12, and a wiring protective layer 16 that covers the current collector wiring 14. The oxide semiconductor layer 13 has a photosensitized dye supported thereon. Furthermore, a terminal 90 that is electrically connected to the current collector wiring 14 is provided at a site on the outside of the sealing section 30 that is on the transparent conductive film 12, and a solder 70 is provided on the terminal 90. In the present embodiment, the first electrode is constituted by the transparent conductive substrate 15, and the terminal section is constituted by the terminal 90.

The transparent substrate 11 of the dye-sensitized solar cell 50A serves as a transparent substrate that is common to both the dye-sensitized solar cells 50A and 50B in the dye-sensitized solar cell module 100.

Figure 2:
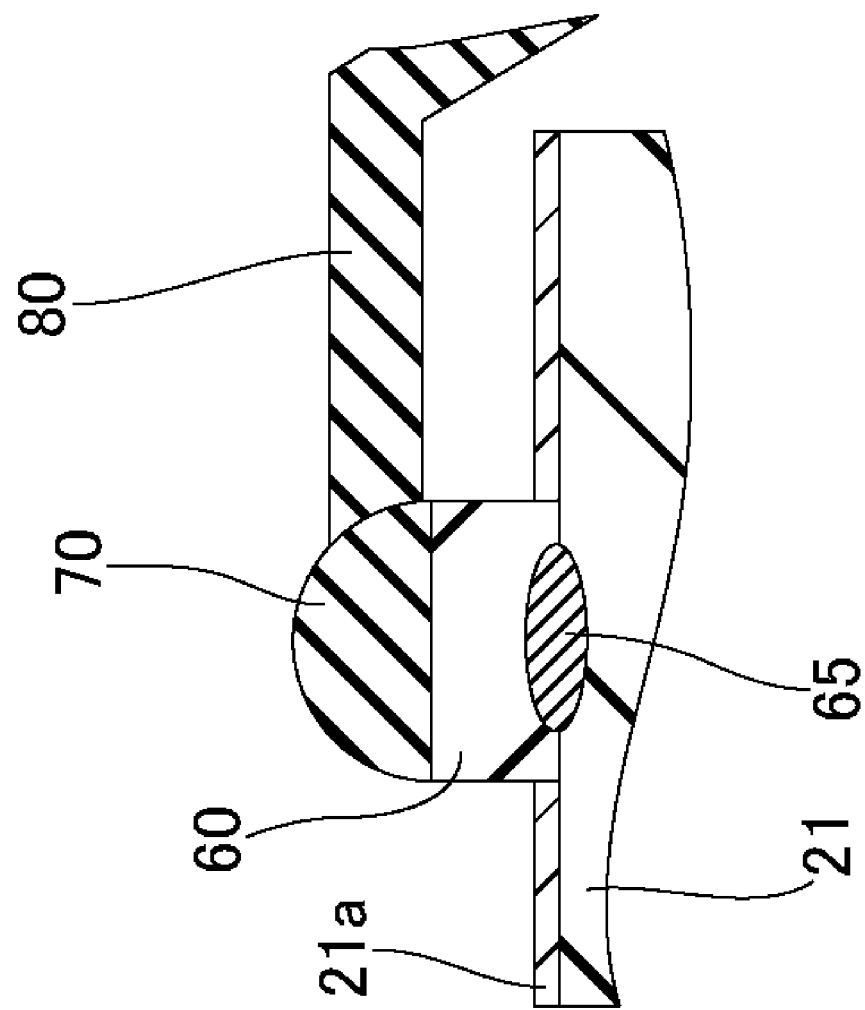
FIG. 2 is a partially enlarged view of FIG. 1.

On the other hand, the counter electrode 20 includes a metal substrate 21 that forms passivation, and a catalyst layer 22 that is provided on the working electrode 10 side of the metal substrate 21 and accelerates a catalytic reaction. Furthermore, a connection member 60 having lower resistance than the metal substrate 21 is provided on the surface 21b of the metal substrate 21 of the counter electrode 20 on the opposite side of the working electrode 10. In the present embodiment, the connection member 60 is provided only on a portion of the metal substrate 21. Here, as illustrated in FIG. 2, in between the connection member 60 and the metal substrate 21 of the counter electrode 20, an alloy section 65 formed from an alloy of the metal that constitutes the metal substrate 21 and the metal that constitutes the connection member 60 is provided. Furthermore, as illustrated in FIG. 1, a solder 70 is provided on the connection member 60. In the present embodiment, a second electrode is constituted by the counter electrode 20.

The dye-sensitized solar cell 50B that is adjacent to the dye-sensitized solar cell 50A also has the same configuration as that of the dye-sensitized solar cell 50A.

The dye-sensitized solar cell 50A and the dye-sensitized solar cell 50B are connected by a conductive wire 80. Specifically, one end of the conductive wire 80 is connected to the connection member 60 of the dye-sensitized solar cell 50A by the solder 70, and the other end of the conductive wire 80 is connected to the terminal 90 of the dye-sensitized solar cell 50B by the solder 70. Meanwhile, to the connection member 60 of the dye-sensitized solar cell 50A, the conductive wire 80 is connected through the solder 70. This conductive wire 80 is intended for injecting electrons from the outside of the dye-sensitized solar cell module 100.

According to the dye-sensitized solar cell module 100, an alloy section 65 formed from an alloy of the metal that constitutes the metal substrate 21 of the counter electrode 20 and the metal that constitutes the connection member 60 is provided between the counter electrode 20 and the connection member 60. Therefore, the connection strength between the counter electrode 20 and the connection member 60 becomes large, and excellent connection reliability is obtained. Furthermore, as the alloy section 65 is provided between the counter electrode 20 and the connection member 60, the contact resistance between the counter electrode 20 and the connection member 60 can also be decreased.

Hereinafter, the working electrode 10, photosensitized dye, counter electrode 20, sealing section 30, electrolyte 40, connection member 60, solder 70, conductive wire 80, and terminal 90 will be described in detail.

(Working Electrode)

The working electrode 10 includes, as described above, a transparent conductive substrate 15 formed from a transparent substrate 11 and a transparent conductive film 12 that is provided on the transparent substrate 11; and an oxide semiconductor layer 13 that is provided on the transparent conductive film 12 of the transparent conductive substrate 15 and has a photosensitized dye supported thereon.

The transparent substrate 11 is constituted by a substrate formed of a light-transmissive material, that is, a transparent material. Examples of such a material include glasses such as borosilicate glass, soda lime glass, a glass which is made of soda lime and whose iron component is less than that of ordinary soda lime glass, and quartz glass; polyethylene terephthalate (PET), polycarbonate (PC), polyether sulfone (PES), and polyethylene naphthalate (PEN). As the light-transmissive material, usually, any material that is used as a transparent base material for photoelectric conversion element can be used. The transparent substrate 11 is appropriately selected among these in consideration of resistance to the electrolyte 40, or the like. Furthermore, for the transparent substrate 11, a base material having light transmissibility that is as excellent as possible is preferred, and a base material having a light transmittance of 90% or higher is more preferred. The thickness of the transparent substrate 11 is appropriately determined depending on the size of the dye-sensitized solar cell module 100 and is not particularly limited, but for example, the thickness may be adjusted to the range of 50 µm to 10,000 µm.

The transparent conductive film 12 is preferably a thin film formed of a conductive metal oxide, so as to have a structure that does not conspicuously impair the transparency of the working electrode 10. Examples of such a conductive metal oxide include indium tin oxide (ITO), fluorine-doped tin oxide (FTO), and tin oxide ($SnO_2$). Furthermore, the transparent conductive film 12 may be constituted of a single layer, or of a laminate of plural layers composed of different conductive metal oxides. When the transparent conductive film 12 is constituted of a single layer, the transparent conductive film 12 is preferably formed of ITO or FTO, from the viewpoint that the process of film forming is easy, and the production cost is low. Furthermore, the transparent conductive film 12 is more preferably composed of FTO, from the viewpoint of having high heat resistance and chemical resistance.

Furthermore, when the transparent conductive film 12 is constituted of a laminate composed of plural layers, it is preferable because the characteristics of various layers can be reflected. Particularly, the transparent conductive film is preferably a laminated film formed by laminating a film formed of FTO on a film formed of ITO. In this case, a transparent conductive film 12 having high conductive property, heat resistance and chemical resistance can be realized, and a transparent conductive substrate 15 having a small amount of light absorption in the visible region and having high electrical conductivity can be constructed. Also, the thickness of the transparent conductive film 12 may be, for example, adjusted to the range of 0.01 µm to 2 µm.

The oxide semiconductor that forms the oxide semiconductor layer 13 is not particularly limited, and any oxide semiconductor that is usually used to form a porous oxide semiconductor layer for photoelectric conversion element can be used. Examples of such an oxide semiconductor include titanium oxide ($TiO_2$), silica ($SiO_2$), tin oxide ($SnO_2$), tungsten oxide ($WO_3$), zinc oxide (ZnO), niobium oxide ($Nb_2O_5$), strontium titanate ($SrTiO_3$), indium oxide ($In_3O_3$), zirconium oxide ($ZrO_2$), thallium oxide ($Ta_2O_5$), lanthanum oxide ($La_2O_3$), yttrium oxide ($Y_2O_3$), holmium oxide ($Ho_2O_3$), bismuth oxide ($Bi_2O_3$), cerium oxide ($CeO_2$), and aluminum oxide ($Al_2O_3$). These can be used singly or in combination of two or more kinds.

The average particle size of the particles of these oxide semiconductors is preferably 1 nm to 1000 nm, from the viewpoint that the surface area of the oxide semiconductor covered by the photosensitized dye becomes large, that is, the space for conducting photoelectric conversion becomes large, and more electrons can be produced. Furthermore, the oxide semiconductor layer 13 is preferably constructed by laminating oxide semiconductor particles having different particle size distributions. In this case, light reflection can be caused to occur repeatedly within the oxide semiconductor layer 13, so that the incident light that is lost to the outside of the oxide semiconductor layer 13 can be reduced, and light can be efficiently converted to electrons. The thickness of the oxide semiconductor layer 13 may be, for example, adjusted to 0.5 µm to 50 µm. Meanwhile, the oxide semiconductor layer 13 can be constituted of a laminate of plural oxide semiconductors formed from different materials.

Examples of the photosensitized dye include ruthenium complexes containing a bipyridine structure, a terpyridine structure or the like as a ligand; metal-containing complexes such as porphyrin and phthalocyanine; and organic dyes such as eosin, rhodamine, and merocyanine. Among these, any dye which exhibits a behavior appropriate for the use and the semiconductor used can be selected without any particular limitations. Specifically, N3, N719, Black Dye, and the like can be used.

(Counter Electrode)

The counter electrode 20 is constituted of a metal substrate 21 and a catalyst layer 22 that accelerates a reduction reaction. The metal substrate 21 is a substrate which forms passivation 21a on the surface of the substrate (see FIG. 2), and as the metal that constitutes the metal substrate 21 that forms the passivation 21a, for example, a metal having durability to the electrolyte 40, that is, a metal having corrosion resistance to the electrolyte 40, such as titanium, nickel, niobium, aluminum, tungsten, SUS, platinum or molybdenum, can be used. The thickness of the metal substrate 21 is appropriately determined depending on the size of the dye-sensitized solar cell 50 and is not particularly limited, but the thickness may be adjusted to, for example, 0.005 mm to 0.1 mm. The catalyst layer 22 is formed from platinum, a carbon-based material (carbon), an electroconductive polymer, or the like. Here, as the carbon-based material, carbon nanotubes are suitably used.

(Sealing Section)

The sealing section 30 connects the working electrode 10 and the counter electrode 20, and the electrolyte 40 between the working electrode 10 and the counter electrode 20 is sealed by being surrounded by the sealing section 30. Examples of the material that constitutes the sealing section 30 include an ionomer, an ethylene-anhydrous vinyl acetate copolymer, an ethylene-methacrylic acid copolymer, an ethylene-vinyl alcohol copolymer, a resin cured by ultraviolet ray, and a vinyl alcohol polymer. Meanwhile, the sealing section 30 may be constituted of a resin only, or may be constituted of a resin and an inorganic filler.

(Electrolyte)

As the electrolyte 40, an electrolyte obtained by impregnating the oxide semiconductor layer 13 with an electrolytic solution; an electrolyte obtained by impregnating the oxide semiconductor layer 13 with an electrolytic solution, subsequently gelling (quasi-solidification) this electrolytic solution by using an appropriate gelling agent, and thereby integrating the electrolytic solution with the oxide semiconductor layer 13; or a gel-like electrolyte containing an ionic liquid, oxide semiconductor particles or electroconductive particles can be used.

Regarding the electrolytic solution described above, a solution formed by dissolving an electrolyte component in an organic solvent is used. Examples of the electrolyte component include redox couples such as a couple of $I^-/I_3^-$ and a couple of bromine/bromide ion; and tertiary-butylpyridine. As the organic solvent, acetonitrile, methoxyacetonitrile, methoxypropionitrile, propionitrile, ethylene carbonate, propylene carbonate, diethyl carbonate, γ-butyrolactone, or the like can be used. A gelling agent may be added to the electrolytic solution. Examples of the gelling agent that is used when this electrolytic solution is gelled include polyvinylidene fluoride, polyethylene oxide derivatives, and amino acid derivatives.

Furthermore, the electrolyte 40 may be composed of an ionic liquid electrolyte formed from a mixture of an ionic liquid and a volatile component. The ionic liquid is not particularly limited, but as the ionic liquid, a liquid that is in a molten state at near room temperature (normal temperature molten salt) is used. Examples of the ionic liquid include salts that are meltable at normal temperature, which use compounds having a quaternized nitrogen atom as cations or anions. Examples of the cations of the normal temperature molten salt include quaternized imidazolium derivatives, quaternized pyridinium derivatives, quaternized triazolium derivatives, and quaternized ammonium derivatives. Examples of the anions of the normal temperature molten salt include $BF_4^-$, $PF_6^-$, $F(HF)_n^-$, bis(trifluoromethylsulfonyl)imide $[N(CF_3SO_2)_2^-]$, and iodide ion. Specific examples of the ionic liquid include salts formed from a quaternized imidazolium-based cation and iodide ion or bis(trifluoromethylsulfonyl)imide ion. Among them, salts formed from a quaternized imidazolium-based cation and bis(trifluoromethylsulfonyl)imide ion, such as 1-ethyl-3-methylimidazolium bis(trifluoromethylsulfonyl)imide, are suitably used. Furthermore, examples of the volatile component include the organic solvents described above, LiI, $I_2$, 4-t-butylpyridine, and N-methylbenzimidazole.

As the oxide semiconductor particles described above, the kind of the material, the particle size and the like are not particularly limited, but oxide semiconductor particles which have excellent miscibility with an electrolytic solution containing an ionic liquid as a main component and are capable of gelling this electrolytic solution, are used. Furthermore, the oxide semiconductor particles need to be particles that do not decrease the conductive property of the electrolyte 40, and have excellent chemical stability to other coexistent components contained in the electrolyte 40. Particularly, it is preferable that even when the electrolyte 40 contains a redox couple such as iodine/iodide ion or bromine/bromide ion, the oxide semiconductor particles do not undergo deterioration due to an oxidation reaction.

As such oxide semiconductor particles, particles of one kind or a mixture of two or more kinds selected from the group consisting of $TiO_2$, $SnO_2$, $WO_3$, $ZnO$, $Nb_2O_5$, $In_2O_3$, $ZrO_2$, $Ta_2O_5$, $La_2O_3$, $SrTiO_3$, $Y_2O_3$, $Ho_2O_3$, $Bi_2O_3$, $CeO_2$, and $Al_2O_3$ are preferred, and titanium dioxide fine particles (nanoparticles) are particularly preferred. The average particle size of this titanium dioxide is preferably about 2 nm to 1000 nm.

As the conductive particles, particles having conductive property, such as particles of a conductor or a semiconductor, are used. The resistivity of these conductive particles is preferably in the range of $1.0 \times 10^{-2}$ Ω·cm or less, and more preferably in the range of $1.0 \times 10^{-3}$ Ω·cm or less. Furthermore, there are no particular limitations on the kind of the conductive particles, the particle size, and the like, but conductive particles which have excellent miscibility with an electrolytic solution containing an ionic liquid as a main component, and are capable of gelling this electrolytic solution, are used. Such conductive particles are required to be such that the conductive property does not easily decrease in the electrolyte 40, and the chemical stability to other coexistent components contained in the electrolyte 40 is excellent. Particularly, it is preferable that even when the electrolyte 40 contains a redox couple such as iodine/iodide ion or bromine/bromide ion, the conductive particles do not undergo deterioration due to an oxidation reaction or the like.

Examples of such conductive particles include particles formed from materials containing carbon as a main component. Specific examples of the conductive particles include carbon nanotubes, carbon fibers, and particles of carbon black. The methods for producing these materials are all known, and commercially available products can also be used.

(Connection Member)

A connection member 60 is formed on the surface of the counter electrode 20 which is on the opposite side of the working electrode 10, that is, on the surface of the metal substrate 21 of the counter electrode 20. The connection member 60 is intended for connecting two dye-sensitized solar cells 50. As the metal that constitutes the connection member 60, a metal having lower resistance than the counter electrode 20 is used. Examples of such a metal include copper, silver, and nickel, but from the viewpoint of having excellent conductive property and solder wettability, it is preferable to use copper.

The connection member 60 is preferably provided at an area 20a that faces the electrolyte 40 in the counter electrode 20 (see FIG. 1). In this case, the distance from the connection member 60 to the electrolyte 40, in which a current passes through the metal substrate 21 having higher resistance than the connection member 60, can be shortened, and the resistance between the connection member 60 and the electrolyte 40 can be reduced.

(Solder)

As the solder 70, for example, a high melting point solder can be used. The high melting point solder is a solder having a melting point of 200° C. or higher (for example, 210° C. or higher). Examples of such a high melting point solder include a Sn—Cu system, a Sn—Ag system, a Sn—Ag—Cu system, a Sn—Au system, a Sn—Sb system, and a Sn—Pb system (the Pb content is, for example, greater than 85% by mass). Among these, one may be used singly, or two or more may be used in combination.

Furthermore, as the solder 70, a solder having a lower melting point than the high melting point solder (hereinafter, may be referred to as a low melting point solder) can also be used. As the low melting point solder, it is suitable to use, for example, a solder having a melting point of lower than 200° C. Examples of such a solder include eutectic type solder (for example, Sn—Pb), and lead-free type solder (for example, Sn—Ag, Sn—Cu, Sn—Ag—Cu, Sn—Zn, and Sn—Zn—B).

When a low melting point solder is used, the photosensitized dye supported on the oxide semiconductor layer 13, or the electrolyte 40 can be prevented from being heated to a high temperature at the time of soldering between the conductive wire 80 and the connection member 60, and thus deterioration of the photosensitized dye or the electrolyte 40 can be suppressed.

(Leading Wire)

Examples of the material that constitutes the conductive wire 80 include metals such as gold, silver, copper, platinum, and aluminum.

Next, the method for producing the dye-sensitized solar cell module 100 as illustrated in FIG. 1 will be described.

First, a working electrode 10 and a counter electrode 20 are prepared (preparation step).

The working electrode 10 can be obtained by the following process. First, a transparent conductive film 12 is formed on one surface of a transparent substrate 11, and thus a transparent conductive substrate 15 is obtained.

Examples of the method for forming the transparent conductive film 12 on the transparent substrate 11 include thin film forming methods such as a sputtering method, a CVD (chemical vapor deposition) method, a spray pyrolysis deposition method (SPD method), and a vapor deposition method.

Next, an oxide semiconductor layer 13 is formed on the transparent conductive film 12 in the transparent conductive substrate 15 (oxide semiconductor layer forming step).

As the method for forming the oxide semiconductor layer 13, for example, a method of applying a dispersion liquid obtained by dispersing commercially available oxide semiconductor particles in a desired dispersion medium, or a colloidal solution that can be prepared by a sol-gel method, with desired additives being added thereto as necessary, by a known application method such as a screen printing method, an inkjet printing method, a roll coating method, a doctor blade method, or a spray coating method, and then porosifying the oxide semiconductor layer by forming pores through a heating treatment or the like; or the like can be applied.

Next, the terminal 90 that is formed on the transparent conductive film 12 of the transparent conductive film 15 is formed by, for example, applying a silver paste by printing or the like, and calcining the paste by heating.

Next, a photosensitized dye is supported on the oxide semiconductor layer 13 (dye supporting step).

As the method for supporting the photosensitized dye on the oxide semiconductor layer 13, first, a dye solution for supporting a photosensitized dye, for example, a solution prepared by adding a trace amount of an N3 dye powder to a solvent obtained by mixing acetonitrile and t-butanol at a volume ratio of 1:1, is prepared in advance.

Next, the solution containing a photosensitized dye in a solvent, which has been placed in a Petri dish-shaped container, is subjected to heating to about 120° C. to 150° C. in a separate electric furnace, and the working electrode 10 in which the oxide semiconductor layer 13 is formed is left immersed in the solution. In this state, the working electrode is immersed for one day and night (approximately 20 hours) in a dark place. Thereafter, the working electrode 10 having the oxide semiconductor layer 13 formed thereon is removed from the solution containing a photosensitized dye, and the working electrode 10 is washed using a mixed solution composed of acetonitrile and t-butanol. Thereby, a working electrode 10 having an oxide semiconductor layer 13 with a photosensitized dye supported thereon is obtained.

On the other hand, in order to prepare a counter electrode 20, first, a metal substrate 21 capable of forming a passivation is prepared. Then, a catalyst layer 22 formed from platinum or the like is formed on the surface of the metal substrate 21 thus prepared. The formation of the catalyst layer 22 is carried out by a sputtering method or the like. Thereby, a counter electrode 20 having a metal substrate 21 and a catalyst layer 22 can be obtained.

Next, an electrolyte 40 is applied on the oxide semiconductor layer 13, and thus the electrolyte 40 is disposed (electrolyte disposition step).

Next, the working electrode 10 and the counter electrode 20 are arranged to face each other, and thereby, the electrolyte 40 is sealed by a sealing section 30 (sealing step).

In order to achieve this, first, a resin that constitutes the sealing section 30 or a precursor thereof is formed on the working electrode 10. At this time, the resin or a precursor thereof is formed so as to surround the oxide semiconductor layer 13 of the working electrode 10. When the resin is a thermoplastic resin, the resin can be obtained by applying a molten resin on the working electrode 10, and then naturally cooling the resin at room temperature, or by bringing a film-like resin into contact with the working electrode 10, heating and melting the resin by an external heat source, and then naturally cooling the resin at room temperature. As the thermoplastic resin, for example, an ionomer or an ethylene-methacrylic acid copolymer is used. When the resin is a resin cured by ultraviolet ray, an ultraviolet-curable resin which is a precursor of the resin is applied on the working electrode 10. When the resin is a water-soluble resin, an aqueous solution containing the resin is applied on the working electrode 10. As the water-soluble resin, for example, a vinyl alcohol polymer is used.

Next, the resin that constitutes the sealing section 30 or a precursor thereof is formed on the counter electrode 20. The resin or a precursor thereof on the counter electrode 20 is formed at a position at which, when the working electrode 10 and the counter electrode 20 are arranged to face each other, the resin or a precursor thereof is overlapped with the resin or a precursor thereof on the working electrode 10. Furthermore, the formation of the resin or a precursor thereof on the counter electrode 20 may be carried out in the same manner as in the case of the resin or a precursor thereof that is formed on the working electrode 10.

Then, the working electrode 10 and the counter electrode 20 are arranged to face each other, and the resin on the counter electrode and the working electrode 11 are superimposed. Thereafter, in an environment at reduced pressure, when the resin is a thermoplastic resin, the resin is heated and melted, and thereby the working electrode 10 and the counter electrode 20 are adhered. In this manner, the sealing section 30 is obtained. When the resin is a resin cured by ultraviolet ray, the ultraviolet-curable resin on the counter electrode 20 and the working electrode 10 are superimposed, and then the ultraviolet-curable resin is cured by ultraviolet radiation. Thus, the sealing section 30 is obtained. When the resin is a water-soluble resin, the water-soluble resin is applied on the counter electrode 20, and then the water-soluble resin is dried at room temperature so as not to stick to the finger. Subsequently, the resin is dried in a low humidity environment, and thus the sealing section 30 is obtained.

Next, a connection member 60 having lower resistance than the metal substrate 21 is fixed onto the surface of the metal substrate 21 in the counter electrode 20, the surface being on the opposite side of the working electrode 10 (connection member fixation step).

Fixation of the connection member 60 to the metal substrate 21 is carried out in the following manner. First, the connection member 60 is disposed on the surface of the counter electrode 20 on the opposite side of the working electrode 10.

Figure 3:
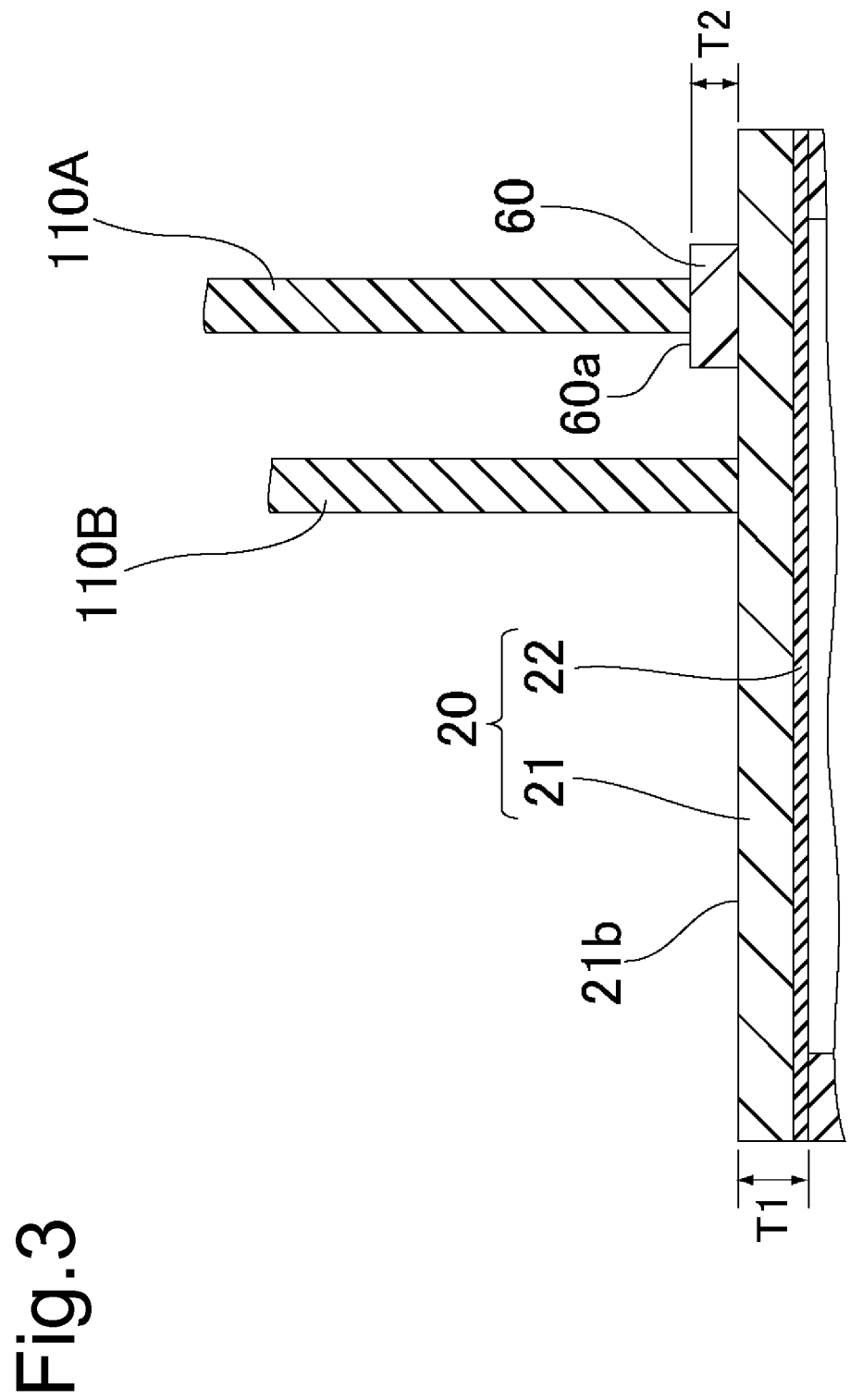
FIG. 3 is a partial cross-sectional view illustrating the process of bonding the connection member of FIG. 1 to a metal substrate.

Next, the connection member 60 is bonded to the metal substrate 21 by resistance welding. Here, as illustrated in FIG. 3, resistance welding is a method of pressing two electrodes for resistance welding 110A and 110B to the connection member 60 and the metal substrate 21, or pressing the electrodes for resistance welding to any one of the connection member 60 and the metal substrate 21, passing an electric current between the two members, thereby generating heat at the contact area between the connection member 60 and the metal substrate 21, melting both the connection member 60 and the metal substrate 21 by this heat, and thereby connecting the two members. At this time, heat is generated only at the contact area between the metal substrate 21 and the connection member 60. Furthermore, in regard to resistance welding, since the time for passing an electric current is a short time (several milliseconds (ms)), the duration of heat generation is also short. Therefore, the space at which heat is applied can be restricted to a localized region. Accordingly, even in the case of forming the connection member 60 on the area 20a that faces the electrolyte 40 in the metal substrate 21 of the counter electrode 20 after the sealing step, deterioration of the photosensitized dye supported on the oxide semiconductor layer 13 can be sufficiently suppressed.

Furthermore, at this time, since the metal substrate 21 forms passivation 21a (see FIG. 2), if a connection member 60 having a lower resistance than the metal substrate 21 is used, the contact resistance between the metal substrate 21 and the connection member 60 becomes large on the occasion of resistance welding. For this reason, the area at which the metal substrate 21 and the connection member 60 are brought into contact with each other can be easily melted by heat. When the voltage that is applied between the two electrodes 110A and 110B is turned off, the molten part congeals, and an alloy section 65 is formed. Therefore, the bonding strength between the metal substrate 21 and the connection member 60 can be sufficiently enhanced. Accordingly, when the dye-sensitized solar cell module 100 is produced by connecting in series the plural dye-sensitized solar cells 50 thus obtained, a dye-sensitized solar cell module 100 having excellent connection reliability can be obtained. Furthermore, even in the case of connecting an external circuit and the connection member 60 through a conductive wire 80, the dye-sensitized solar cell module 100 acquires excellent connection reliability. Furthermore, as an alloy section 65 is provided between the metal substrate 21 of the counter electrode 20 and the connection member 60, the contact resistance between the counter electrode 20 and the connection member 60 can also be decreased. Furthermore, since the space at which heat is applied can be restricted to a localized region by bonding the connection member 60 to the metal substrate 21 by resistance welding, the connection member 60 can be fixed to a region on the inner side of the sealing section 30. In this case, the distance in which an electric current passes through the metal substrate 21 having a larger resistance than the connection member 60 from the connection member 60 to the electrolyte 40, can be shortened, and the resistance between the connection member 60 and the electrolyte 40 can be made small.

Furthermore, as illustrated in FIG. 3, when the connection member 60 is fixed to the metal substrate 21 of the counter electrode 20, it is preferable to carry out resistance welding by bringing, while having the connection member 60 brought into contact with the surface 21b of the metal substrate 21 on the opposite side of the working electrode 10, two electrodes for resistance welding 110A and 110B respectively into direct contact with the surface 60a of the connection member 60 and the surface 21b of the metal substrate 21.

In this case, when the connection member 60 is connected to the counter electrode 20 by resistance welding, welding is terminated without pressing the two electrodes 110A and 110B against the surface on the working electrode 10 side of the metal substrate 21 of the counter electrode 20. Therefore, deformation at the surface on the working electrode 10 side of the metal substrate 21 can be sufficiently prevented. Furthermore, there is also an advantage that adhesion of the electrodes for resistance welding 110A and 110B to the surface on the working electrode 10 side of the metal substrate 21 can be prevented.

Furthermore, resistance welding is preferably carried out for 1 ms to 20 ms, more preferably for 3 ms to 20 ms, and particularly preferably for 5 ms to 7 ms. In this case, the connection strength between the counter electrode 20 and the connection member 60 can be more sufficiently enhanced, and also, an appropriate thickness of the alloy section 65 is obtained. Thus, the resistance between the connection member 60 and the metal substrate 21 can be made sufficiently lower.

The thickness T1 of the counter electrode 20 is not particularly limited, but the thickness is preferably 9 μm to 200 μm, and more preferably 20 μm to 100 μm. If the thickness T1 of the counter electrode 20 is 9 μm or greater, the strength is sufficiently enhanced as compared with the case where the thickness is less than 9 μm, and deformation does not easily occur on the occasion of resistance welding. On the other hand, when the thickness T1 of the counter electrode 20 is 200 μm or less, the connection member 60 can be connected to the counter electrode 20 in a shorter time as compared with the case where the thickness is greater than 200 μm. Furthermore, the counter electrode 20 can be made flexible.

The thickness T2 of the connection member 60 is also not particularly limited, but the thickness is preferably 9 μm to 200 μm, and more preferably 20 μm to 100 μm.

In this case, when the thickness T2 of the connection member 60 is 9 μm or greater, the strength is sufficiently enhanced as compared with the case where the thickness is less than 9 μm, and deformation does not easily occur on the occasion of resistance welding. On the other hand, when the thickness T2 of the connection member 60 is 200 μm or less, the connection member 60 can be connected to the counter electrode 20 in a shorter time as compared with the case where the thickness is greater than 200 μm. Furthermore, the surface asperity of the surface 21b of the counter electrode 20 on the opposite side of the working electrode 10 can be reduced, and in the case of installing the dye-sensitized solar cell 50 by bringing the counter electrode 20 into contact with a flat surface, the dye-sensitized solar cell 50 can be stably installed.

Since the electric current that is applied between the two electrodes for resistance welding 110A and 110B is also dependent on the combination between the connection member 60 and the metal substrate 21, it cannot be said sweepingly, but the current is usually 0.5 kA to 5 kA, and preferably 1 kA to 3 kA.

Furthermore, it cannot be said sweepingly about the time for current application, but the time is preferably 1 ms to 20 ms, more preferably 3 ms to 20 ms, and particularly preferably 5 ms to 10 ms.

Furthermore, it cannot be said sweepingly about the distance between the electrodes for resistance welding, but the distance is usually 0.5 mm to 20 mm, and preferably 1 mm to 10 mm.

Next, a solder 70 is brought into contact with the connection member 60, melted, and then cooled. In this manner, the solder 70 is bonded to the connection member 60. Furthermore, the solder 70 is brought into contact also with the top of a terminal 90, melted, and then cooled. In this manner, the solder 70 is bonded to the terminal 90.

In this manner, the dye-sensitized solar cell 50A as illustrated in FIG. 1 is obtained.

Then, a dye-sensitized solar cell 50B is produced in the same manner.

Next, a conductive wire 80 such as a lead wire is provided, and the dye-sensitized solar cell 50A and the dye-sensitized solar cell 50B are connected by means of the conductive wire 80. Specifically, an end of the conductive wire 80 is fixed to the connection member 60 by means of the solder 70 by bringing the end into contact while melting the solder 70. Next, the other end of the conductive wire 80 is fixed to the terminal 90 by means of the solder 70 by bringing the end into contact while melting the solder 70. Furthermore, an end of the conductive wire 80 is also connected to the solder 70 that has been bonded to the connection member 60 of the dye-sensitized solar cell 50A.

In this manner, a dye-sensitized solar cell module 100 is obtained.

According to the method for producing the dye-sensitized solar cell module 100 described above, as the dye-sensitized solar cell 50 is produced by the production method described above, a dye-sensitized solar cell 50 which has deterioration of the photosensitized dye sufficiently suppressed and has excellent connection reliability is obtained. Accordingly, when the metal substrate 21 of the counter electrode 20 and the terminal 90 of the working electrode 10 of an adjoining dye-sensitized solar cell 50 are connected in the connection step, a dye-sensitized solar cell module 100 having excellent photoelectric conversion characteristics and connection reliability can be obtained. Furthermore, a dye-sensitized solar cell module 100 having excellent connection reliability even with an external circuit can be obtained.

<Second Embodiment>

Next, a second embodiment of the dye-sensitized solar cell module of the present invention will be described. Meanwhile, the same symbols will be assigned to the constituent elements that are the same or equivalent to those of the first embodiment, and any overlapping description will be omitted.

Figure 4:
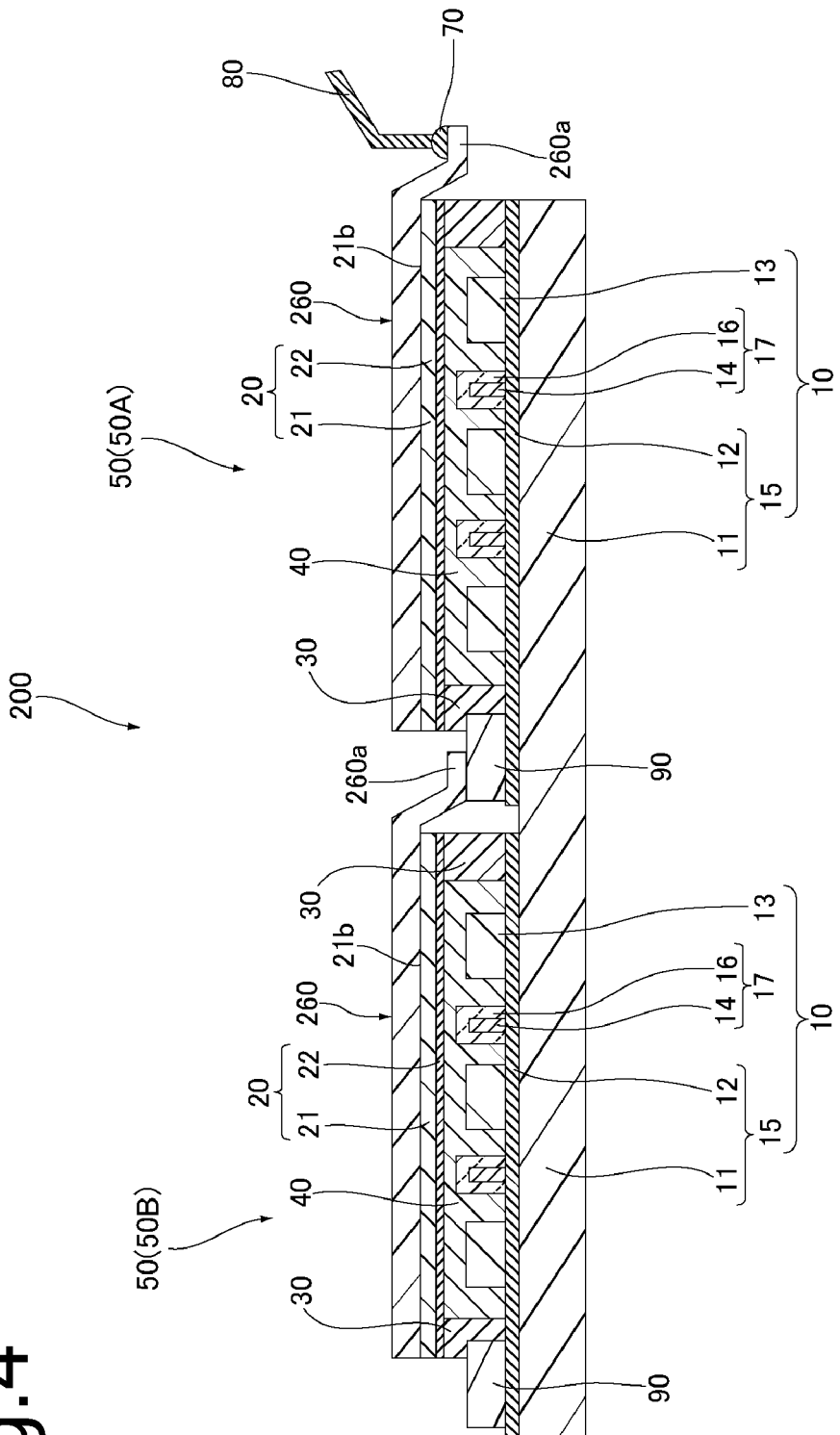
FIG. 4 is a cross-sectional view illustrating a second embodiment of the dye-sensitized solar cell module of the present invention.

FIG. 4 is a cross-sectional view illustrating the second embodiment of the dye-sensitized solar cell module of the present invention. The dye-sensitized solar cell module 200 of the present embodiment is different from the dye-sensitized solar cell module 100 of the first embodiment in view of the state of connection between the dye-sensitized solar cells 50A and 50B.

That is, as illustrated in FIG. 4, in the dye-sensitized solar cell module 200 of the present embodiment, the dye-sensitized solar cells 50A and 50B each include a connection member 260, instead of the connection member 60, on the surface 21b of the metal substrate 21 of the counter electrode 20 on the opposite side of the working electrode 10. In the present embodiment, the connection member 260 is provided in a linear shape on a portion of the metal substrate 21. A portion of the connection member 260 is fixed to an area that faces the electrolyte 40 in the counter electrode 20. The connection member 260 is formed of a metal having lower resistance than the metal substrate 21. As such a metal, the same metal as the metal that constitutes the connection member 60 can be used. An edge 260a of the connection member 260 of the dye-sensitized solar cell 50A protrudes over the sealing section 30 toward the adjoining dye-sensitized solar cell 50B, and is directly bonded to the terminal 90. Meanwhile, in the present embodiment, a terminal section is constituted by the terminal 90.

In this case, since adjoining dye-sensitized solar cells 50 can be connected with a sufficiently small resistance as compared with the case of bonding the connection member 260 and the terminal 90 using solder or the like, a decrease in voltage hardly occurs. Furthermore, since the electrons flowing in from the terminal 90 can be lead to the electrolyte 40 through the connection member 260 that has lower resistance than the metal substrate 21, the resistance from the connection member 260 to the electrolyte 40 can also be made small.

At this time, fixation of the connection member 260 to the metal substrate 21 of the counter electrode 20 is carried out by resistance welding (connection member fixation step). Specifically, both of the two electrodes for resistance welding may be pressed against the surface 21b of the metal substrate 21 on the opposite side of the working electrode 10, and a voltage may be applied between the two electrodes for resistance welding. The resistance welding may be carried out in the same manner as in the first embodiment.

Even in the case of fixing the connection member 260 to the metal substrate 21 of the counter electrode 20 as such, similarly to the first embodiment, deterioration of the photosensitized dye supported on the oxide semiconductor layer 13 can be sufficiently suppressed. Furthermore, since the metal substrate 21 and the connection member 260 are bonded by melting through the connection member fixation step, an alloy section is formed between the two members. Therefore, the bonding strength between the metal substrate 21 and the connection member 260 becomes large, and a dye-sensitized solar cell 50 having excellent connection reliability can be obtained. Furthermore, in the case of producing the dye-sensitized solar cell module 200 by connecting plural dye-sensitized solar cells 50 thus obtained in series, the connection reliability of the dye-sensitized solar cell module 200 can be enhanced.

Furthermore, it is also preferable to carry out the connection between the edge 260a of the connection member 260 and the terminal 90 by resistance welding.

In this case, the edge 260a of the connection member 260 provided on the counter electrode 20 of one dye-sensitized solar cell 50B between two adjoining dye-sensitized solar cells 50A and 50B, and the terminal 90 provided on the transparent conductive substrate 15 of the other dye-sensitized solar cell 50A can be conveniently bonded without using solder or the like, and also, the connection strength can be increased, while the contact resistance can be decreased. Furthermore, since resistance welding is carried out by locally contacting the electrodes for resistance welding when the connection member 260 of one dye-sensitized solar cell 50B and the terminal 90 provided on the transparent conductive substrate 15 of the other dye-sensitized solar cell 50A are bonded, heat is generated only locally. Therefore, as compared with the case of carrying out bonding by using solder or the like, deterioration of the photosensitized dye supported on the oxide semiconductor layer 13, or of the sealing section 30 is more sufficiently suppressed. Meanwhile, the resistance welding between the terminal 260a of the connection member 260 and the terminal 90 may also be carried out by pressing two electrodes for resistance welding against the surface of the connection member 260, and applying a voltage between the two electrodes for resistance welding, as in the same manner as the above.

<Third Embodiment>

Figure 5:
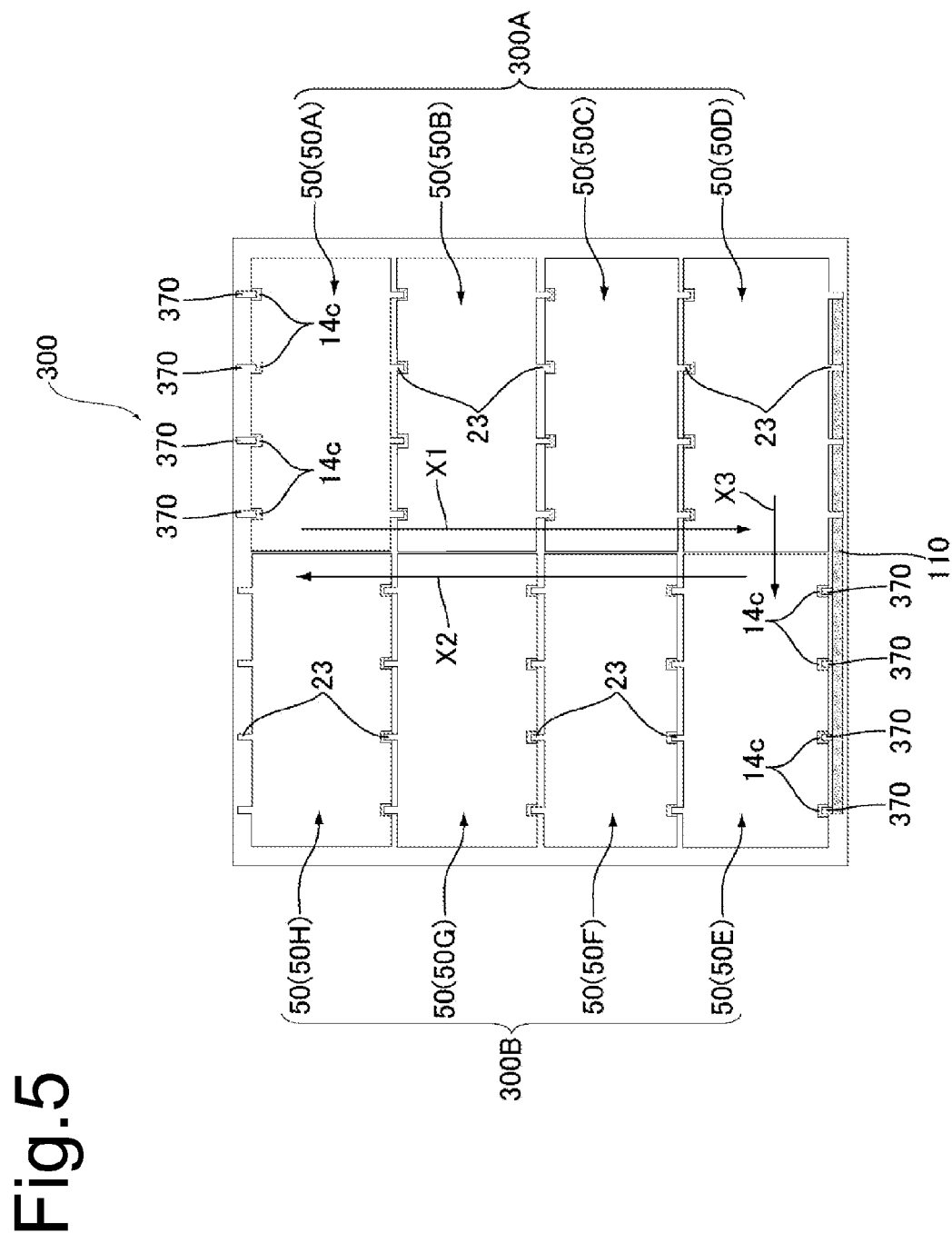
FIG. 5 is a plan view illustrating a third embodiment of the dye-sensitized solar cell module of the present invention.

First, a third embodiment of the dye-sensitized solar cell module of the present invention will be described. Meanwhile, the same symbols will be assigned to the constituent elements that are the same or equivalent to those of the first and second embodiments, and any overlapping description will be omitted. FIG. 5 is a bottom view illustrating the third embodiment of the dye-sensitized solar cell module of the present invention.

As illustrated in FIG. 5, the dye-sensitized solar cell module 300 includes two dye-sensitized solar cell module units 300A and 300B. The dye-sensitized solar cell module units 300A and 300B are electrically connected in series. The dye-sensitized solar cell module units 300A and 300E each include plural dye-sensitized solar cells 50, and the plural dye-sensitized solar cells 50 are electrically connected in series. Here, the two dye-sensitized solar cell module units 300A and 300B are arranged such that the direction of arrangement X1 of the dye-sensitized solar cells 50 in the dye-sensitized solar cell module unit 300A and the direction of arrangement X2 of the dye-sensitized solar cells 50 in the dye-sensitized solar cell module unit 300B are parallel to each other. Hereinafter, for the convenience of explanation, four dye-sensitized solar cells 50 in the dye-sensitized solar cell module unit 300A may be referred to as dye-sensitized solar cells 50A to 50D, and four dye-sensitized solar cells 50 in the dye-sensitized solar cell module unit 300B may be referred to as dye-sensitized solar cells 50E to 50H.

Figure 6:
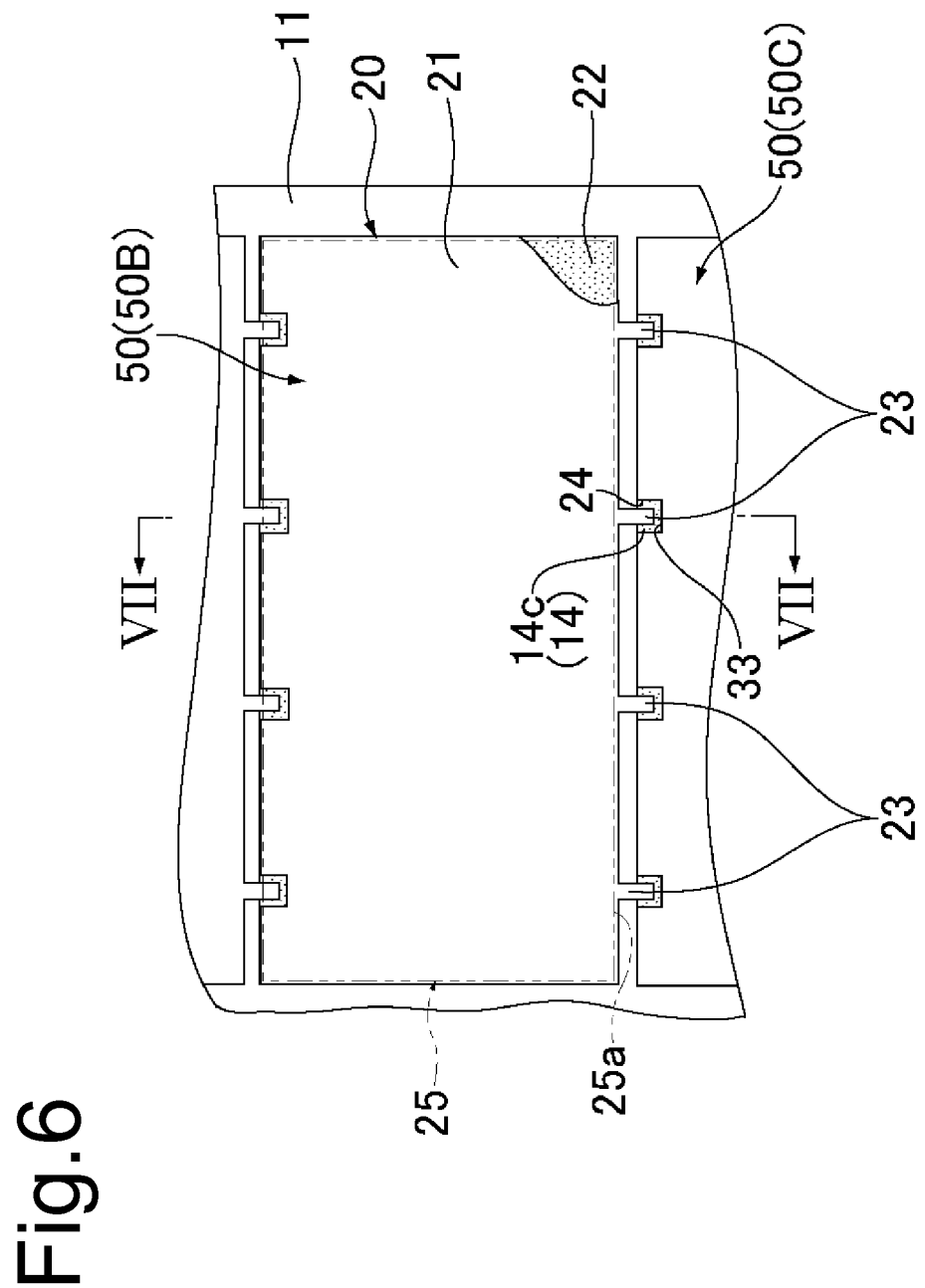
FIG. 6 is a partially cutaway enlarged view of FIG. 5.
Figure 7:
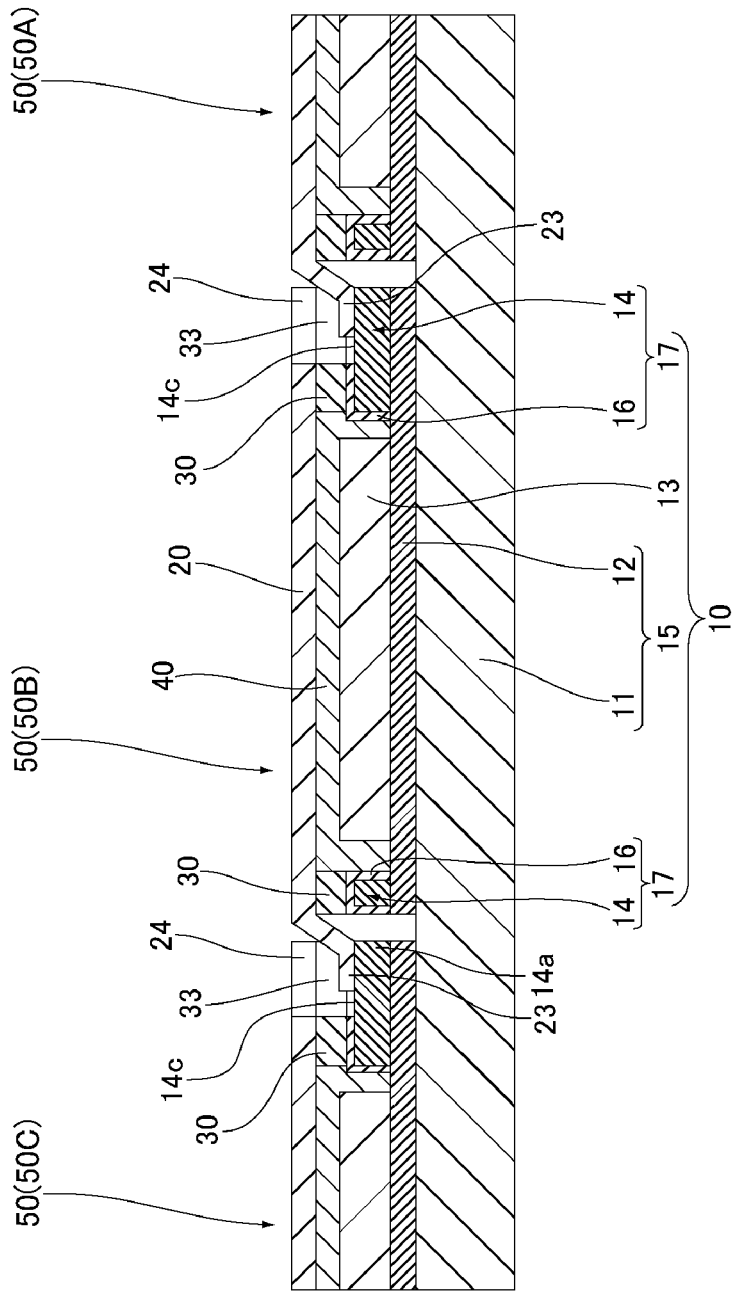
FIG. 7 is a cross-sectional view of FIG. 6 cut along the VII-VII line.
Figure 8:
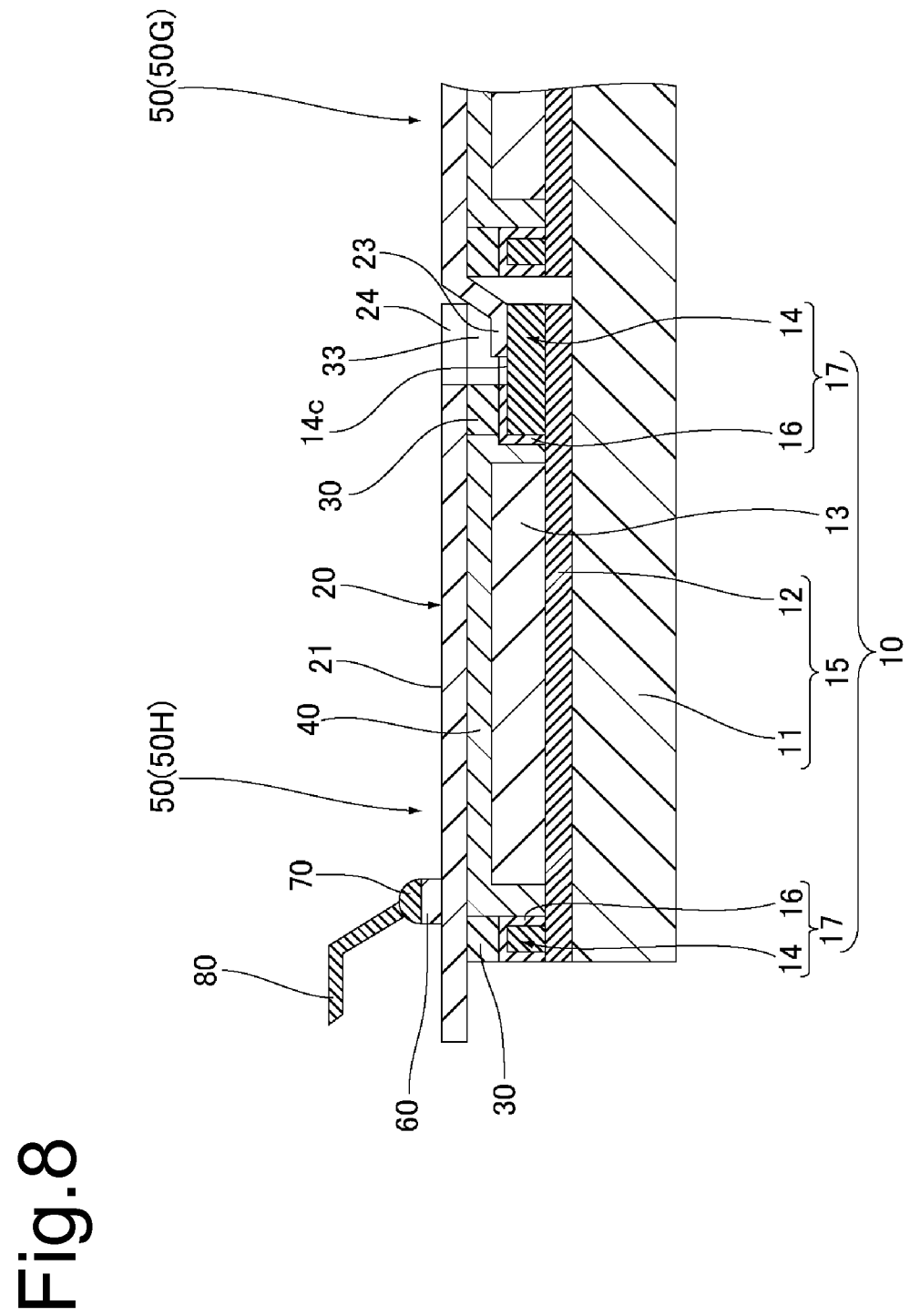
FIG. 8 is a cross-sectional diagram illustrating a portion of the dye-sensitized solar cell unit of FIG. 5.
Figure 9:
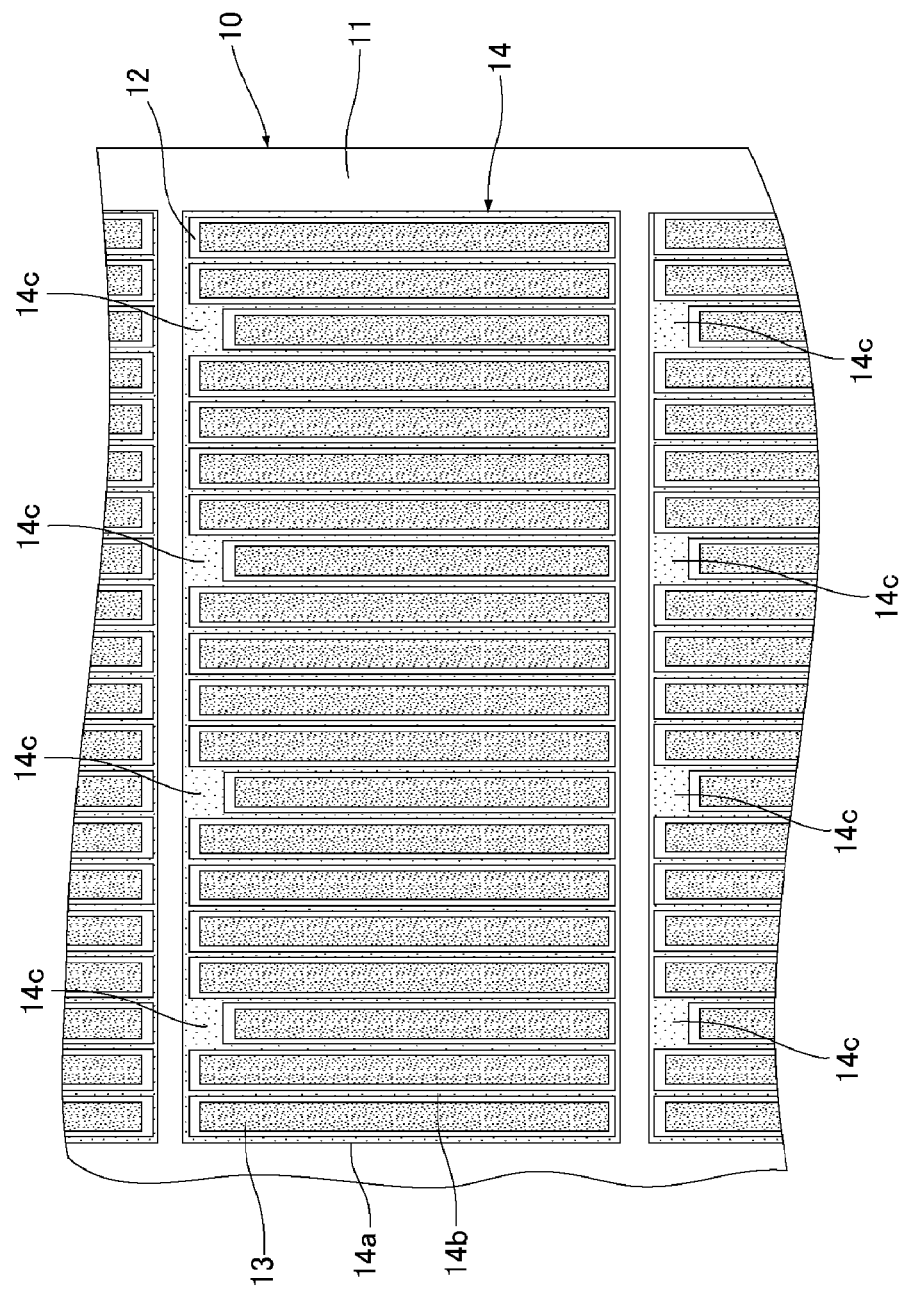
FIG. 9 is a plan view illustrating the first electrode of FIG. 5.

FIG. 6 is a partially cutaway enlarged view of FIG. 5, FIG. 7 is a cross-sectional view of FIG. 6 cut along the VII-VII line, and FIG. 8 is a cross-sectional diagram illustrating a portion of the dye-sensitized solar cell unit 300B of FIG. 5. FIG. 9 is a plan view illustrating the working electrode of FIG. 7. As illustrated in FIG. 7, each of the plural dye-sensitized solar cells 50 includes a working electrode 10, a counter electrode 20 that faces the working electrode 10, and a sealing section 30 that connects the working electrode 10 and the counter electrode 20, and an electrolyte 40 is filled in the cell space formed by the working electrode 10, the counter electrode 20, and the sealing section 30.

Next, the connection relationship between adjoining dye-sensitized solar cells 50 will be described. Here, the connection relationship between the dye-sensitized solar cell 50B and the dye-sensitized solar cell 50C will be described as an example.

First, the dye-sensitized solar cell 50B will be described.

As illustrated in FIG. 7, in the dye-sensitized solar cell 50B, the working electrode 10 includes a transparent conductive substrate 15 composed of a transparent substrate 11 and a transparent conductive film 12 that is provided on the transparent substrate 11; plural oxide semiconductor layers 13 that are provided on the transparent conductive film 12 of the transparent conductive substrate 15; and a wiring section that is provided so as to surround each of the plural oxide semiconductor layers 13 on the transparent conductive film 12. The wiring section 17 is provided between a sealing section 30 and the transparent conductive film 12, and includes a current collector wiring 14 that is provided on the transparent conductive film 12, and a wiring protective layer 16 that protects the current collector wiring 14 from the electrolyte 40. In the present embodiment, a first electrode and a first electrode section are constituted by the transparent conductive substrate 15.

The transparent substrate 11 of the dye-sensitized solar cell 50B serves as a transparent substrate common to all of the dye-sensitized solar cells 50A to 50H in the dye-sensitized solar cell module 300.

On the other hand, as illustrated in FIG. 6, the counter electrode 20 of the dye-sensitized solar cell 50B includes a main body section 25 indicated by a two-dot-one-dash line of FIG. 6, and plural protruding sections (four in FIG. 6) 23 that protrude from a portion of an edge 25a on the adjoining dye-sensitized solar cell 50C side in the main body section 25. Here, the main body section 25 is composed of a laminate of a metal substrate 21 and a catalyst layer 22 that is provided on the working electrode 10 side of the metal substrate 21 and accelerates a catalytic reaction. The protruding sections 23 are each composed of the metal substrate 21 only. In the present embodiment, a second electrode and a second electrode section are constituted by the counter electrode 20.

Next, the dye-sensitized solar cell 50C will be described.

In the working electrode 10 of the dye-sensitized solar cell 50C, as illustrated in FIG. 9, the current collector wiring 14 includes a rectangular annular outer peripheral section 14a and plural partition sections (finger wires) 14b that partition the inner opening of the outer peripheral section 14a, and the oxide semiconductor layers 13 are surrounded by the outer peripheral section 14a and the partition sections 14b. Furthermore, as illustrated in FIG. 7, the current collector wiring 14 includes land sections 14c that are provided on the inner side of the outer peripheral section 14a on the adjoining dye-sensitized solar cell 50B side within the outer peripheral section 14 that serves as an edge of the current collector wiring 14. The sealing section 30 is provided on the current collector wiring 14, and on the outside of the sealing section 30, a concave section 33 formed by the sealing section 30 is provided. The land section 14c is formed by the concave section 33. That is, as the concave section 33 is provided on the outside of the sealing section 30, portions of the current collector wiring 14 are exposed, and the exposed areas serve as the land sections 14c.

Furthermore, in the counter electrode 20 of the dye-sensitized solar cell 50C, cut-outs 24 are formed at positions that face the land sections 14c (see FIG. 7).

As illustrated in FIG. 7, the protruding sections 23 of the counter electrode 20 of the dye-sensitized solar cell 50B are connected directly to the land sections 14c of the dye-sensitized solar cell 50C, at the concave sections 33 formed by the sealing section 30 on the outside of the sealing section 30. Meanwhile, in the present embodiment, a terminal section is constituted by the land sections 14c of the current collector wiring 14.

Also for the two adjoining dye-sensitized solar cells 50A and 50B, the two adjoining dye-sensitized solar cells 50B and 50C, the two adjoining dye-sensitized solar cells 50C and 50D, the two adjoining dye-sensitized solar cells 50E and 50F, the two adjoining dye-sensitized solar cells 50F and 50G, and the two adjoining dye-sensitized solar cells 50G and 50H, similarly, the protruding sections 23 of the counter electrode 20 in one of the dye-sensitized solar cells 50 are connected directly to the land sections 14c of the current collector wiring 14 in the adjoining dye-sensitized solar cell 50 at the concave sections 33 formed by the sealing section 30 on the outside of the sealing section 30.

Meanwhile, in the present embodiment, the dye-sensitized solar cells 50A to 50H all have the same configuration. That is, in the dye-sensitized solar cells 50A to 50H, the working electrode 10 includes land sections 14c on the inner side than the outer peripheral section 14a that is an edge of the current collector wiring 14, and on the outside of the sealing section 30. In other words, the working electrode 10 includes land sections 14c that are formed by the concave sections 33. Furthermore, the counter electrode 20 includes at least one protruding section 23 that protrudes from a portion of the edge 25a on the adjoining dye-sensitized solar cell 50 side of the main body section 25. Further, as illustrated in FIG. 5, in the dye-sensitized solar cell module unit 300A, the protruding sections 23 of the respective counter electrodes 20 of the dye-sensitized solar cells 50A to 50D protrude toward the same direction with respect to the main body section 25 (the direction directed from the dye-sensitized solar cell 50A toward the dye-sensitized solar cell 50D, that is, the direction of arrow X1 in FIG. 5). On the other hand, in the dye-sensitized solar cell module unit 300B, the protruding sections 23 of the respective counter electrodes 20 of the dye-sensitized solar cells 50E to 50H protrude toward the same direction with respect to the main body section 25 (the direction directed from the dye-sensitized solar cell 50E toward the dye-sensitized solar cell 50H, that is, the direction of arrow X2 in FIG. 5). That is, the direction of protrusion of the protruding section 23 of the counter electrode 20 with respect to the main body section 25 in the dye-sensitized solar cell module unit 300A and the direction of protrusion of the protruding section 23 of the counter electrode 20 with respect to the main body section 25 in the dye-sensitized solar cell module unit 300B are opposite to each other.

Furthermore, as illustrated in FIG. 5, in the dye-sensitized solar cell 50E in the dye-sensitized solar cell module unit 300B, that is, in the dye-sensitized solar cell 50 disposed at an end of the dye-sensitized solar cell module unit 300B, connection terminals 370 are provided at the land sections 14c of the current collector wiring 14. Further, the connection terminal 370 and the protruding sections 23 of the dye-sensitized solar cell 50D are connected through a conductive member 110 that is provided along the surface of the transparent substrate 11. By means of this conductive member 110, the dye-sensitized solar cell module unit 300A and the dye-sensitized solar cell module unit 300B are connected in series. As the material that constitutes the conductive member 110, for example, copper, silver, nickel and the like are used. Furthermore, examples of the shape of the conductive member 110 include a tape form and a wire form, but a tape form is preferably used since the thickness of the dye-sensitized solar cell module 300 can be made small at the time of use.

Furthermore, also in the dye-sensitized solar cell 50A of the dye-sensitized solar cell module unit 300A, connection terminals 370 are provided at the land sections 14c of the current collector wiring 14 of the working electrode 10.

Furthermore, as illustrated in FIG. 8, in the dye-sensitized solar cell 50H of the dye-sensitized solar cell module unit 300B, a connection member 60 is bonded to the metal substrate 21 of the counter electrode 20. Then, a solder 70 is bonded to the connection member 60, and a conductive wire 80 is connected to the solder 70. Here, in between the connection member 60 and the metal substrate 21, an alloy section formed from an alloy of the metal of the metal substrate 21 and the metal that constitutes the connection member 60 is formed.

Next, the operating effect of the dye-sensitized solar cell module 300 described above will be explained.

According to the dye-sensitized solar cell module 300, in the dye-sensitized solar cell 50H among the plural dye-sensitized solar cells 50, an alloy section formed from an alloy of the metal of the metal substrate 21 and the metal that constitutes the connection member 60 is formed in between the connection member 60 and the metal substrate 21. Accordingly, the bonding strength between the metal substrate 21 and the connection member 60 becomes large, and excellent connection reliability is obtained. Furthermore, as an alloy section is provided between the metal substrate 21 of the counter electrode 20 and the connection member 60, the contact resistance between the metal substrate 21 of the counter electrode 20 and the connection member 60 can also be decreased.

Furthermore, the protruding section 23 protrudes, at the counter electrode 20 of one dye-sensitized solar cell 50 of two adjoining dye-sensitized solar cells 50, from only a portion of the edge 25a on the other dye-sensitized solar cell 50 side of the main body section 25, and this protruding section 23 is bonded to a land section 14c of the other dye-sensitized solar cell 50 at the concave section 33 that is formed by the sealing section 30 of the other dye-sensitized solar cell 50. For this reason, the area of the connection point between the land section 14c and the protruding section 23 can be made sufficiently large, without significantly decreasing the aperture ratio. Therefore, the dye-sensitized solar cell module 300 has excellent connection reliability.

Thus, the dye-sensitized solar cell module 300 acquires excellent connection reliability by bonding the protruding section 23 that protrudes from only a portion of the edge 25a on the other dye-sensitized solar cell 50 side of the main body section 25, to the land section 14c of the other dye-sensitized solar cell 50 at the concave section 33 that is formed by the sealing section 30 of the other dye-sensitized solar cell 50. For this reason, it is not necessary to provide a protruding section 23 at the remaining portion of the edge 25a on the other dye-sensitized solar cell 50 side of the main body section 25. Accordingly, the connection point for connecting the protruding section of the remaining portion and the transparent conductive substrate 15 of the other dye-sensitized solar cell 50 can be omitted, and the aperture ratio can be increased. Particularly, in the dye-sensitized solar cell module 300, the land sections 14c are provided on the inner side of the outer peripheral section 14a that is an edge of the current collector wiring 14. In other words, the land sections 14c are formed by the concave sections 33 that are provided on the outside of the sealing section 30. Therefore, the gap between the main body sections 25 of two adjoining dye-sensitized solar cells 50 can be made small. That is, the area of the region that does not contribute to power generation can be made small. For this reason, according to the dye-sensitized solar cell module 300, the aperture ratio can be increased as compared with the case where the land sections 14c are provided on the outside of the outer peripheral section 14a that is an edge of the current collector wiring 14, that is, on the outside of the concave sections 33.

Furthermore, in two adjoining dye-sensitized solar cells 50, cut-outs 24 are formed at positions that face the land sections 14c in the counter electrode 20 of one of the dye-sensitized solar cell 50. Therefore, even if a protruding section 23 is moved with respect to the land section 14c to which the protruding section is bonded, for the reasons such as that an object is collided with one dye-sensitized solar cell 50 of two adjoining dye-sensitized solar cells 50, the protruding section 23 can take refuge in the cut-out 24. Accordingly, the contact between the protruding section 23 and the counter electrode 20 of the adjoining dye-sensitized solar cell 50 can be sufficiently prevented.

Furthermore, the dye-sensitized solar cell module 300 includes dye-sensitized solar cell module units 300A and 300B; the dye-sensitized solar cell module units 300A and 300B are electrically connected to each other in series; the directions of arrangement X1 and X2 of the dye-sensitized solar cells 50 are arranged to be parallel to each other; and in each of the dye-sensitized solar cell module units 300A and 300B, the directions of protrusion of the protruding sections 23 with respect to the main body section 25 are the same, while the direction of protrusion of the protruding sections 23 of the counter electrode 20 with respect to the main body section 25 in two adjoining dye-sensitized solar cell module unit 300A and the direction of protrusion of the protruding sections 23 of the counter electrode 20 with respect the main body section 25 in the dye-sensitized solar cell module unit 300B are opposite to each other.

Accordingly, in the two adjoining dye-sensitized solar cell module units 300A and 300B, the land sections 14c of the dye-sensitized solar cell 50E that is at the end among the plural dye-sensitized solar cells 50 that constitute one dye-sensitized solar cell module unit 300B, and the protruding sections 23 of the dye-sensitized solar cell 50D that is at the end among the plural dye-sensitized solar cells 50 that constitute the other dye-sensitized solar cell module unit 300A, can be disposed on the same side with respect to the direction of arrangement X3 of the dye-sensitized solar cell module units 300A and 300B. For this reason, the land sections 14c of the dye-sensitized solar cell 50E that is at the end among the plural dye-sensitized solar cells 50 that constitute one dye-sensitized solar cell module unit 300B, and the protruding sections 23 of the dye-sensitized solar cell 50D that is at the end among the plural dye-sensitized solar cells 50 that constitute the other dye-sensitized solar cell module unit 300A, can be connected outside the light-receiving area. Therefore, according to the dye-sensitized solar cell module 300, one dye-sensitized solar cell module unit 300B and the other dye-sensitized solar cell module unit 300A can be connected in series, without decreasing the aperture ratio.

Next, the method for producing the dye-sensitized solar cell module 300 described above will be described.

First, a transparent conductive substrate 15 which is produced by forming a transparent conductive film 12 on one transparent substrate 11, is prepared.

As the method for forming the transparent conductive film 12, a sputtering method, a vapor deposition method, a spray pyrolysis deposition (SPD) method, a CVD method, and the like are used.

Next, the transparent conductive film 12 is partitioned into plural transparent conductive films 12 that are separated apart from each other, by means of laser processing, etching or the like.

Next, an oxide semiconductor layer 13 is formed on each of the partitioned plural transparent conductive films 12. The oxide semiconductor layer 13 is formed by printing a paste for forming a porous oxide semiconductor layer which contains oxide semiconductor particles, and then calcining the paste.

The paste for forming an oxide semiconductor layer contains a resin such as polyethylene glycol and a solvent such as terpineol, in addition to the oxide semiconductor particles. As the oxide semiconductor that constitutes the oxide semiconductor particles, the same materials as those listed as the oxide semiconductor for forming the oxide semiconductor layer 13 in the first embodiment can be used.

As the method for printing the paste for forming an oxide semiconductor layer, for example, a screen printing method, a doctor blade method, and a bar coating method can be used.

The calcination temperature may vary depending on the material of the oxide semiconductor particles, but the calcination temperature is usually 350° C. to 600° C. The calcination time may vary depending on the material of the oxide semiconductor particles, but the calcination time is usually 1 hour to 5 hours.

Next, a paste containing an electroconductive material such as silver is applied on the transparent conductive film 12. At this time, the application of the paste is carried out such that, as illustrated in FIG. 9, an outer peripheral section 14a, partition sections 14b that partition the inner opening of the outer peripheral section 14a, and land sections 14c that are provided on the inner side of the outer peripheral section 14a are formed. The paste is then calcined, and thus a current collector wiring 14 is obtained.

Next, the current collector wiring 14 is coated with a wiring protective layer 16 of low melting point glass frit or the like (see FIG. 7). At this time, the wiring protective layer 16 is provided so as to cover the outer peripheral section 14a and the partition sections 14b, but not to cover the land sections 14c. In this manner, a wiring section 17 based on the current collector wiring 14 and the wiring protective layer 16 is obtained.

In this manner, plural working electrodes 10 are obtained.

Next, sealing sections 30 of the same number as the number of the dye-sensitized solar cells 50 are prepared. For each sealing section 30, a sealing section in which an opening that surrounds the oxide semiconductor layer 13 is formed is used.

Then, this sealing section 30 is adhered onto the current collector wiring 14 of the working electrode 10. At this time, a sealing section 30 having the same shape may also be adhered to the surface of the counter electrode 20. The adhesion of the sealing section 30 to the current collector wiring 14 or the counter electrode 20 can be carried out by heating and melting the sealing section 30. At this time, at the land sections 14c of the current collector wiring 14, the sealing section 30 is adhered so as to provide concave sections 33 for forming the land sections 14c on the outside of the sealing section 30.

Next, a photosensitized dye is supported on the oxide semiconductor layers 13 of the plural working electrodes 10. To this end, a photosensitized dye may be adsorbed onto the oxide semiconductor layer 13 by immersing the working electrode 10 in a solution containing the photosensitized dye, thereby adsorbing the photosensitized dye onto the oxide semiconductor layer 13, subsequently washing away any excess photosensitized dye with the solvent component of the solution, and drying the working electrode. However, even if a photosensitized dye is adsorbed onto the oxide semiconductor layer 13 by applying a solution containing the photosensitized dye on the oxide semiconductor layer 13 and then drying the solution, the photosensitized dye can also be supported onto the oxide semiconductor layer 13.

Next, an electrolyte 40 is disposed on the oxide semiconductor layers 13 of the plural working electrodes 10. The electrolyte 40 can be disposed by, for example, a printing method such as screen printing.

Next, plural counter electrodes 20 are prepared, and the plural counter electrodes 20 are bonded so as to respectively block the openings of the sealing section 30.

The counter electrode 20 includes, as described above, a main body section 25, and four protruding sections 23 that protrude from a portion of the edge 25a on the adjoining dye-sensitized solar cell 50 side of the main body section 25. Here, the main body section 25 is constituted of a laminate of a metal substrate 21 and a catalyst layer 22, and the protruding sections 23 are constituted only of the metal substrate 21. However, the protruding sections 23 may also be constituted of a laminate of a metal substrate 21 and a catalyst layer 22.

Figure 10:
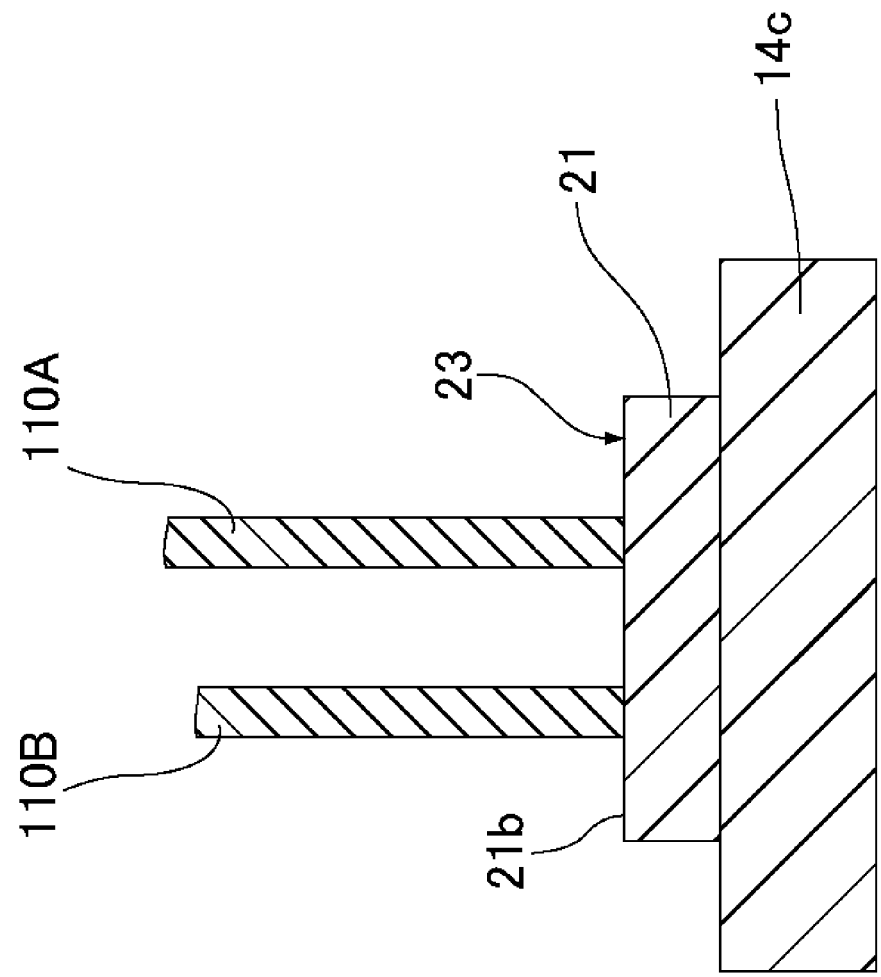
FIG. 10 is a diagram illustrating that a land section and a protruding section being connected by resistance welding.

Next, the protruding sections 23 of the counter electrode 20 are connected to the land sections 14c of the current collector wiring 14 in the working electrode 10 of an adjoining dye-sensitized solar cell 50. The connection of the protruding sections 23 to the land sections 14c can be carried out by, for example, resistance welding. As illustrated in FIG. 10, resistance welding is a method of pressing two electrodes for resistance welding 110A and 110B against the protruding section 23 and the land section 14c or any one of them, passing an electric current between the two electrodes, thereby generating heat at the contact area between the land section 14c and the metal substrate 21, melting both the land section 14c and the protruding section 23 by means of this heat, and thereby connecting the two sections. At this time, heat is generated only at the contact area between the land section 14c and the protruding section 23. Furthermore, in regard to resistance welding, since the time for passing an electric current is usually a short time (several milliseconds (ms)), the duration for heat generation is also short. Accordingly, the space to which heat is applied can be restricted to a localized region. Therefore, even in the case of bonding the protruding section 23 of the counter electrode 20 to the land section 14c after the sealing step, deterioration of the photosensitized dye supported on the oxide semiconductor layer 13 can be sufficiently suppressed.

Figure 11:
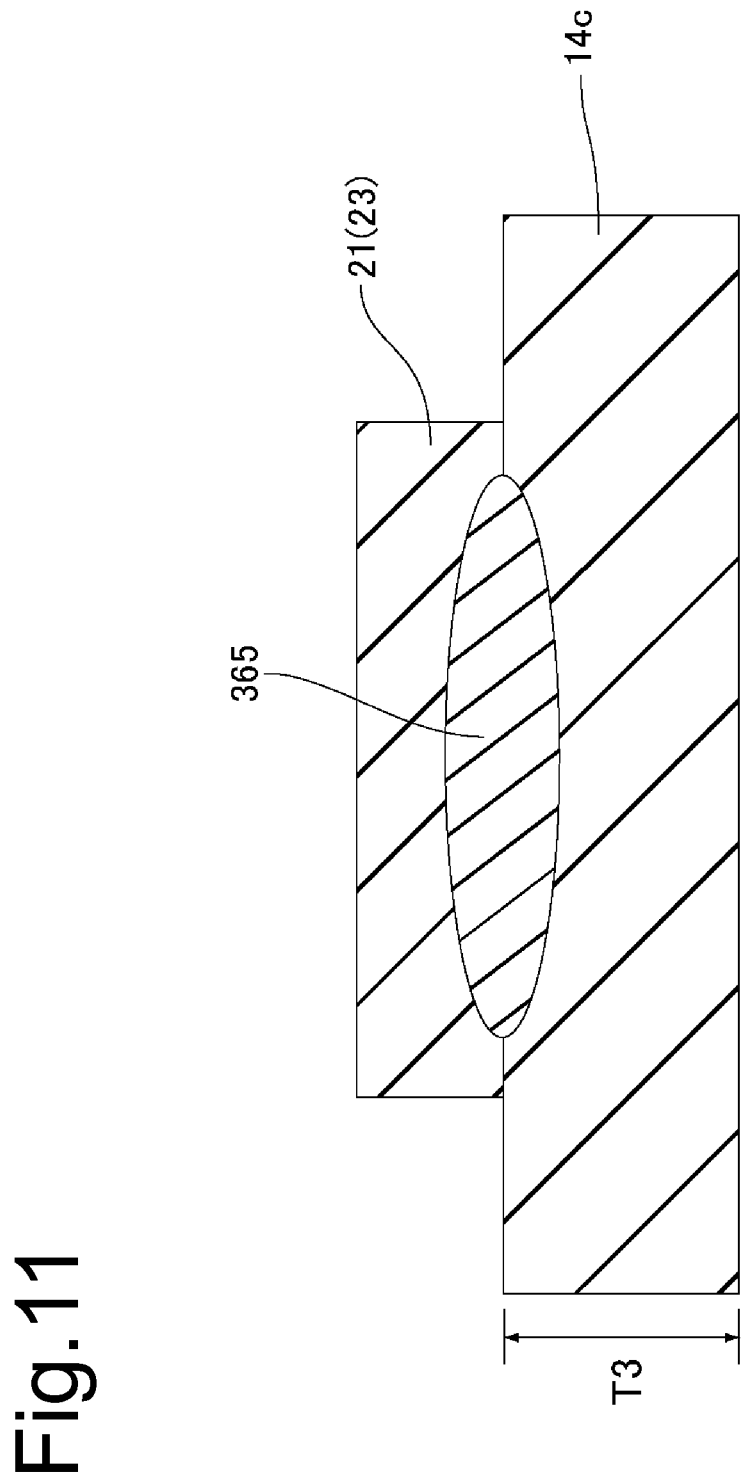
FIG. 11 is a diagram illustrating that an alloy section being formed between a protruding section and a land section.

Furthermore, at this time, since the metal substrate 21 included in the protruding section 23 has a passivation film, if the resistance of the land section 14c is lower than that of the metal substrate 21, the contact resistance between the metal substrate 21 and the land section 14c becomes large. For this reason, the area at which the metal substrate 21 and the land section 14c are brought into contact with each other can be easily melted by heat. Further, when the voltage applied between the two electrodes 110A and 110B is turned off, as illustrated in FIG. 11, the molten part congeals, and an alloy section 365 is formed. Therefore, the bonding strength between the protruding section 23 and the land section 14c can be sufficiently enhanced. Furthermore, when the alloy section 365 is provided between the protruding section 23 of the counter electrode 20 and the land section 14c, the contact resistance between the protruding section 23 of the counter electrode 20 and the land section 14c of the current collector wiring 14 can also be decreased.

Furthermore, when the protruding section 23 of the counter electrode 20 and the land section 14c are connected by resistance welding, as illustrated in FIG. 10, it is preferable to carry out resistance welding by bringing, while having the land section 14c and the protruding section 23 brought into contact with each other, two electrodes for resistance welding 110A and 110E into direct contact with the surface 21b of the protruding section 23 on the opposite side of the land section 14c.

In this case, when the counter electrode 20 and the current collector wiring 14 are connected by resistance welding, welding is terminated without pressing the two electrodes for resistance welding 110A and 110B against the current collector wiring 14 and the surface on the working electrode 10 side of the metal substrate 21 of the counter electrode 20. Therefore, there is an advantage that any impurities caused by the adhesion of the electrodes for resistance welding to the surface on the working electrode 10 side of the metal substrate 21 of the counter electrode 20, can be prevented from remaining. Furthermore, since welding is terminated without pressing the electrodes for resistance welding against the current collector wiring 14, the space required for welding can be made small.

Furthermore, the resistance welding is preferably carried out for 1 ms to 20 ms, more preferably for 3 ms to 20 ms, and particularly preferably for 5 ms to 7 ms. In this case, the connection strength between the counter electrode 20 and the current collector wiring 14 can be more sufficiently enhanced, an appropriate thickness of the alloy section 365 is obtained, and the resistance between the land section 14c of the current collector wiring 14 and the protruding section 23 can be more sufficiently lowered.

The thickness of the counter electrode 20 is not particularly limited, but the thickness is preferably 9 μm to 200 μm, more preferably 9 μm to 200 μm, and even more preferably 20 μm to 100 μm. When the thickness of the counter electrode 20 is 9 μm or greater, the strength becomes larger as compared with the case where the thickness is less than 9 μm, and deformation cannot easily occur on the occasion of resistance welding. On the other hand, when the thickness of the counter electrode 20 is 200 μm or less, the protruding section 23 of the counter electrode 20 and the land section 14c can be connected in a shorter time as compared with the case where the thickness is greater than 200 μm. Furthermore, the counter electrode 20 can be made flexible.

The thickness T3 of the land section 14c of the current collector wiring 14 is also not particularly limited (see FIG. 11), but the thickness is preferably 0.1 μm to 50 μm, and more preferably 1 μm to 30 μm.

In this case, when the thickness T3 of the land section 14c of the current collector wiring 14 is 0.1 μm or greater, the strength becomes larger as compared with the case where the thickness is less than 0.1 μm, and deformation does not easily occur on the occasion of resistance welding. On the other hand, when the thickness T3 of the land section 14c of the current collector wiring 14 is 50 μm or less, the protruding section 23 of the counter electrode 20 and the land section 14c can be connected in a shorter time as compared with the case where the thickness is greater than 50 μm.

Furthermore, in order to bond the protruding section 23 of the counter electrode 20 and the land section 14c by melting, an alloy section 365 is formed between the two sections. Accordingly, the bonding strength between the metal substrate 21 and the current collector wiring 14 increases, and when the plural dye-sensitized solar cells 50 thus obtained are connected in series, a dye-sensitized solar cell module 100 having excellent connection reliability can be obtained. Furthermore, as the alloy section 365 is provided between the counter electrode 20 and the current collector wiring 14, the contact resistance between the counter electrode 20 and the current collector wiring 14 can also be decreased. Therefore, the dye-sensitized solar cell module 300 thus obtainable also acquires excellent conductive property.

Since the electric current that is applied between two electrodes for resistance welding 110A and 110B depends on the combination of the protruding section 23 of the counter electrode 20 and the land section 14c, it cannot be sweepingly said, but the electric current is usually 0.01 kA to 3 kA, and preferably 0.1 kA to 2 kA.

Furthermore, it cannot be said sweepingly about the time for applying the electric current, but the application time is preferably 1 ms to 20 ms, more preferably 3 ms to 20 ms, and particularly preferably 5 ms to 7 ms.

Furthermore, it cannot be said sweepingly about the distance between the electrodes for resistance welding 110A and 110B, but the distance is usually 0.3 mm to 20 mm, and preferably 0.5 mm to 10 mm.

In this manner, the dye-sensitized solar cell module units 300A and 300B are obtained.

Next, a connection terminal 370 is connected respectively to the land sections 14c in the current collector wiring 14 of the dye-sensitized solar cells 50A and 50E. The connection terminal 370 can be connected to the land sections 14c by using a member formed of silver, copper, nickel or the like, by a method such as a resistance welding method. Meanwhile, the connection terminal 370 may be formed, when the current collector wiring 14 is formed, simultaneously with the current collector wiring 14 by a screen printing method, using the same material as that of the current collector wiring 14.

Next, the conductive member 110 is connected to the connection terminal 370. The conductive member 110 can be connected to the connection terminal 370 by, for example, resistance welding.

Next, a connection member 60 is bonded to the metal substrate 21 of the counter electrode 20 by resistance welding in the dye-sensitized solar cell 50H of the dye-sensitized solar cell module unit 300B (connection member fixation step). Resistance welding may be carried out in the same manner as in the first embodiment. Next, a solder 70 is bonded to the connection member 60, and subsequently, a conductive wire 80 is connected to the solder 70.

The dye-sensitized solar cell module 300 is obtained in the manner described above.

When the dye-sensitized solar cell module 300 is produced as described above, since the metal substrate 21 and the connection member 260 are bonded by melting through the connection member fixation step, an alloy section is formed between the two members. Accordingly, the bonding strength between the metal substrate 21 and the connection member 60 becomes large, and a dye-sensitized solar cell 50 having excellent connection reliability can be obtained. Furthermore, when the dye-sensitized solar cell module 300 is produced by connecting in series the plural dye-sensitized solar cells 50 thus obtainable, the connection reliability of the dye-sensitized solar cell module 300 can be enhanced.

<Fourth Embodiment>

Next, a fourth embodiment of the dye-sensitized solar cell module of the present invention will be described. Meanwhile, the same symbols will be assigned to the constituent elements that are the same or equivalent to those of the first to third embodiments, and any overlapping description will be omitted.

Figure 12:
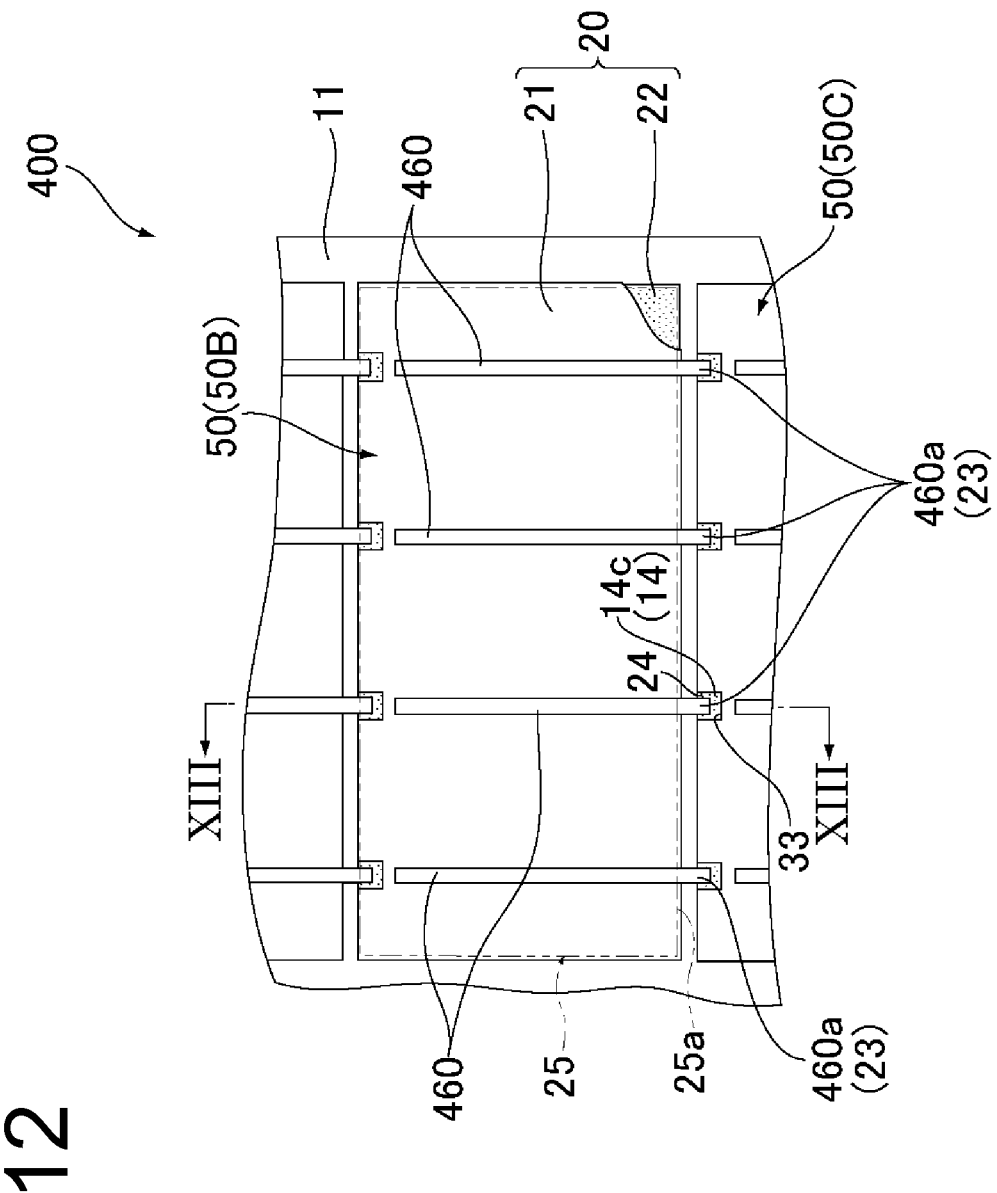
FIG. 12 is a partially cutaway plan view illustrating a fourth embodiment of the dye-sensitized solar cell module of the present invention.
Figure 13:
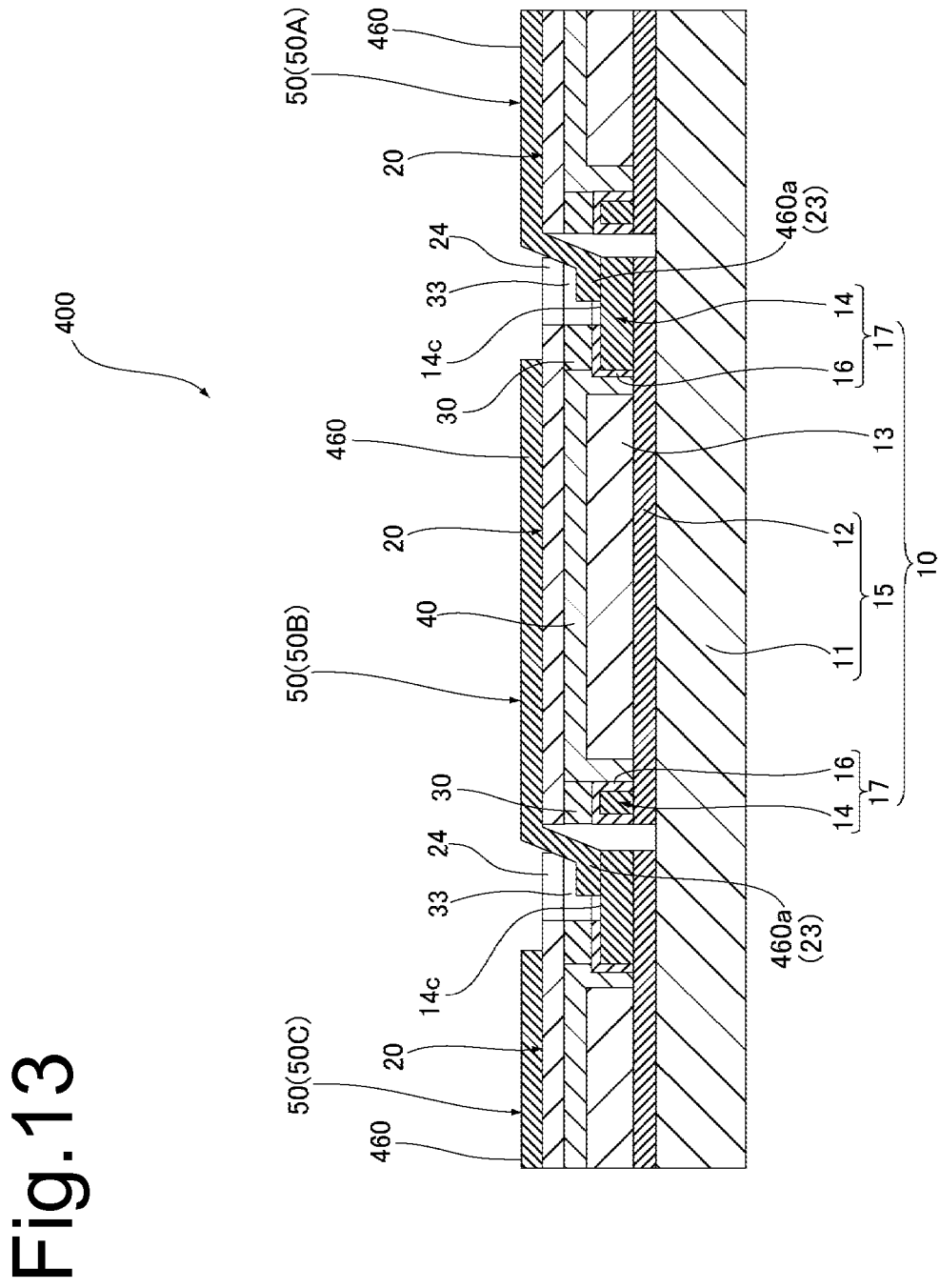
FIG. 13 is a cross-sectional view of the dye-sensitized solar cell module of FIG. 12 cut along the XIII-XIII line.

FIG. 12 is a partially cutaway partial plan view illustrating the fourth embodiment of the dye-sensitized solar cell module of the present invention, and FIG. 13 is a cross-sectional view of FIG. 12 cut along the XIII-XIII line. The dye-sensitized solar cell module 400 of the present embodiment is different from the dye-sensitized solar cell module 300 of the third embodiment in view of the counter electrode.

Figure 14:
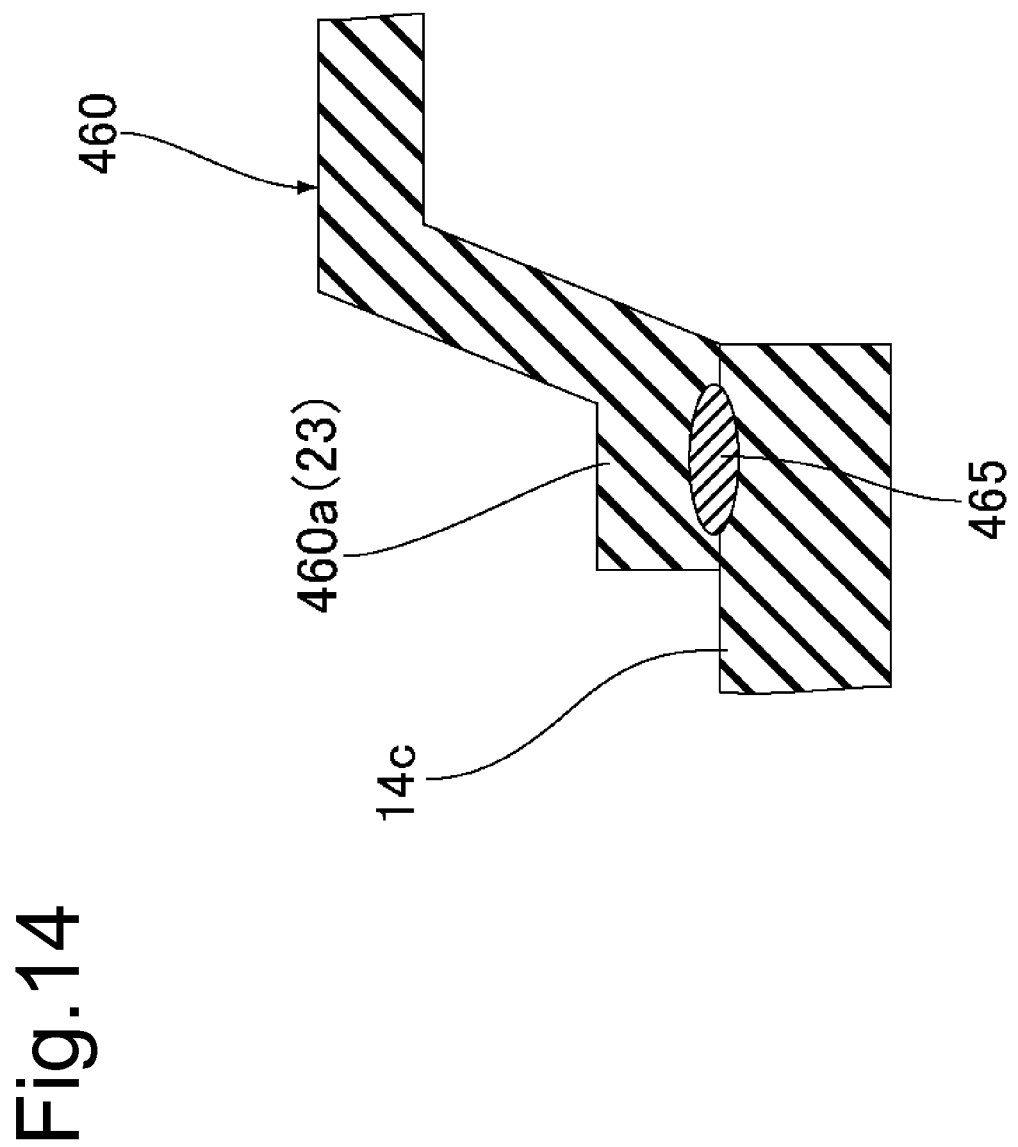
FIG. 14 is a diagram illustrating that an alloy section is formed between a protruding section, which is an edge of a connection member, and a land section.

That is, as illustrated in FIG. 12 and FIG. 13, the dye-sensitized solar cell module 400 of the present embodiment is different from the dye-sensitized solar cell module 300 of the third embodiment in that a connection member 460 which is a linear electroconductive material with plural lines is provided on the surface of the metal substrate 21 on the opposite side of the working electrode 10; an edge 460a of this connection member 460 protrudes as a protruding section 23 from the edge 25a of the main body section 25 of the counter electrode 20; and is directly connected to the land section 14c of the current collector wiring 14 in the working electrode 10 of an adjoining dye-sensitized solar cell 50. The connection member 460 is formed of a metal having lower resistance than the metal substrate 21. Such a metal may be any metal having lower resistance than the metal substrate 21, and as such a metal, for example, copper is used. Here, as illustrated in FIG. 14, an alloy section 465 of the metal that constitutes the connection member 460 and the metal that constitutes the land section 14c is provided between a protruding section 23, which is an edge 460a of the connection member 460, and a land section 14c. Meanwhile, in the present embodiment, a first electrode is constituted by the transparent conductive substrate 15, and a terminal section is constituted by the land section 14c of the current collector wiring 14. Furthermore, the first electrode section is constituted by the transparent conductive substrate 15 and the land section 14c of the current collector wiring 14. Furthermore, in the present embodiment, a second electrode is constituted by the counter electrode 20, and a second electrode section is constituted by the connection member 460 and the counter electrode 20.

In this case, since the alloy section 465 formed from an alloy of the metal that constitutes the connection member 460 and the metal that constitutes the current collector wiring 14 is provided between the connection member 460 and the current collector wiring 14, the connection strength between the connection member 460 and the current collector wiring 14 becomes large, and excellent connection reliability is obtained. Furthermore, since the alloy section 465 is provided between the connection member 460 of the connection member 460 and the current collector wiring 14, the contact resistance between the connection member 460 and the current collector wiring 14 can also be decreased. For this reason, connection between the dye-sensitized solar cells 50 can be achieved with a sufficiently small resistance, and a decrease in voltage hardly occurs. Furthermore, since the electrons that flow in from the land section 14c can approach the electrolyte 40 through the connection member 460 having lower resistance than the metal substrate 21, the resistance from the connection member 460 to the electrolyte 40 can also be made small.

At this time, the connection between the protruding section 23 that is the edge 460a of the connection member 460, and the land section 14c is carried out by resistance welding.

In this case, the protruding section 23 that is the edge 460a of the connection member 460 of one dye-sensitized solar cell 50 between two adjoining dye-sensitized solar cells 50 and the land section 14c of the current collector wiring 14 of the other dye-sensitized solar cell 50 can be conveniently bonded without using solder or the like, and also, the connection strength can be increased, while the contact resistance can also be decreased. Furthermore, since resistance welding is carried out by locally contacting the electrodes for resistance welding when the connection member 460 of one dye-sensitized solar cell 50A and the land section 14c of the other dye-sensitized solar cell 50B are bonded, heat is generated only locally. Therefore, as compared with the case of carrying out bonding by using solder or the like, deterioration of the photosensitized dye supported on the oxide semiconductor layer 13, or of the sealing section 30 is more sufficiently suppressed. Meanwhile, the resistance welding between the protruding section 23 and the land section 14c may also be carried out by pressing two electrodes for resistance welding against the surface of the protruding section 23 on the opposite side of the land section 14c, and applying a voltage between the two electrodes for resistance welding, as in the same manner as the above.

Furthermore, the connection member 460 is bonded to the metal substrate 21 of the counter electrode 20 by resistance welding. Specifically, first, two electrodes for resistance welding may be both pressed against the surface of the connection member 460 on the opposite side of the land section 14c, and a voltage may be applied between the two electrodes for resistance welding. At this time, resistance welding may be carried out in the same manner as in the first embodiment.

Thus, even when the connection member 460 is bonded to the metal substrate 21 of the counter electrode 20, deterioration of the photosensitized dye supported on the oxide semiconductor layer 13, or of the sealing section 30 can be sufficiently suppressed. Furthermore, the conductive property and connection reliability of the dye-sensitized solar cell module 400 thus obtainable can be further enhanced.

The present invention is not limited to the embodiments described above. For example, in the first to fourth embodiments, the oxide semiconductor layer 13 is provided on the transparent conductive film 12, but may also be provided on the metal substrate 21. In this case, the working electrode is composed of the oxide semiconductor layer 13 and the metal substrate 21, and the counter electrode is composed of the transparent substrate 11 and the transparent conductive film 12.

Figure 15:
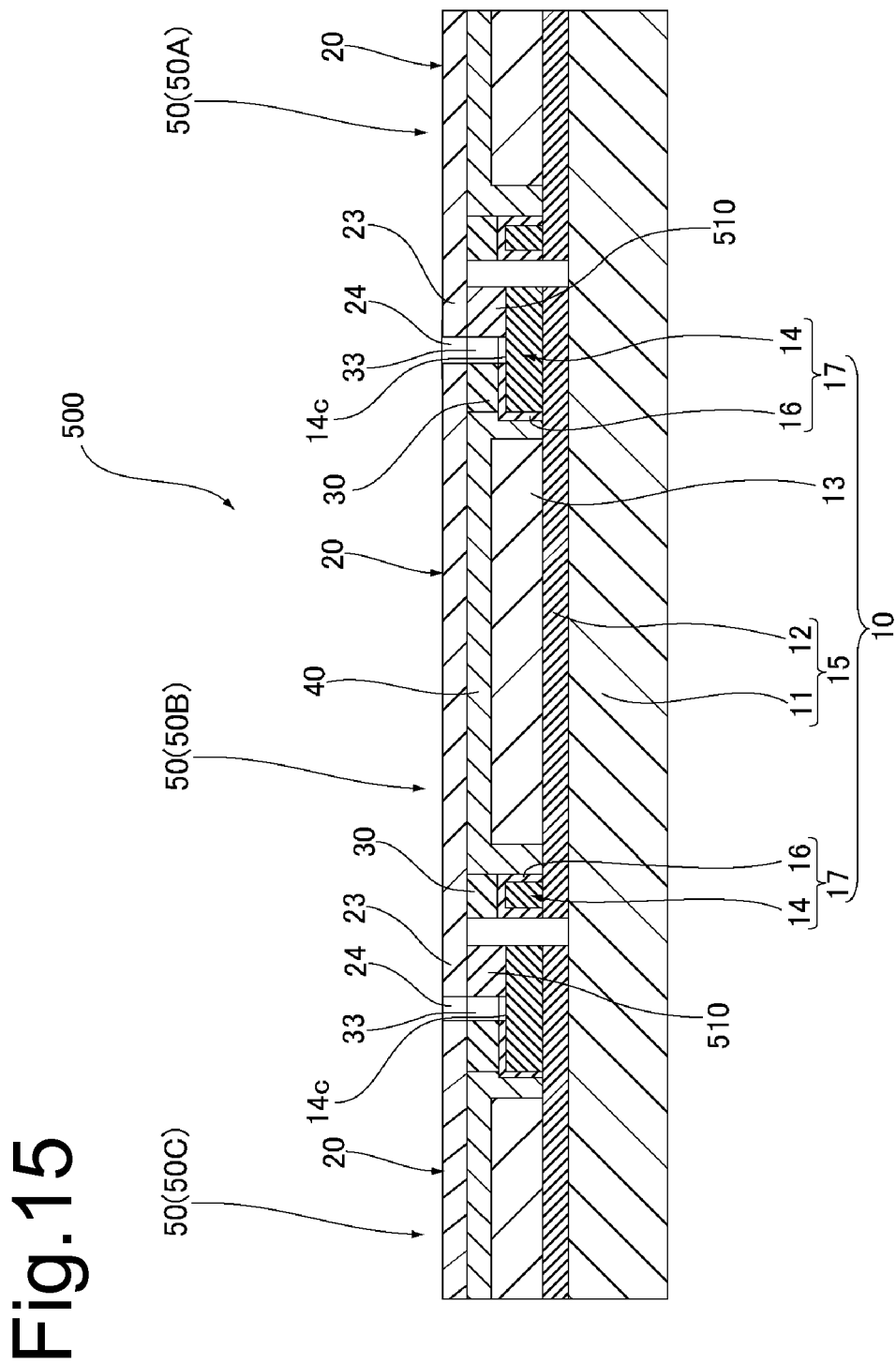
FIG. 15 is a partial cross-sectional view illustrating a fifth embodiment of the dye-sensitized solar cell module of the present invention.
Figure 16:
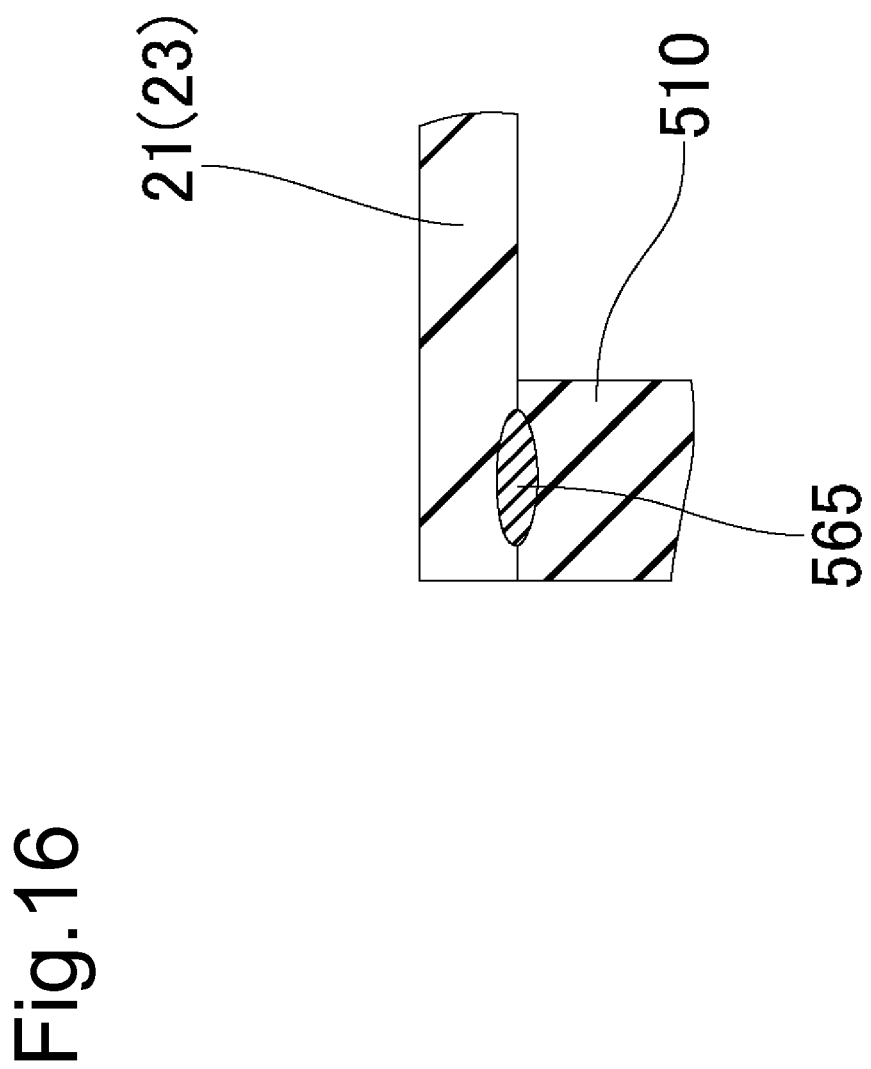
FIG. 16 is a diagram illustrating that an alloy section is formed between a protruding section, which is an edge of a connection member, and an insert material of a terminal section.

Furthermore, for example, in the third embodiment, the metal substrate 21 of the counter electrode 20 is directly connected, as the protruding section 23, to the land section 14c in the current collector wiring 14 of an adjoining dye-sensitized solar cell 50, but as in the case of the dye-sensitized solar cell module 500 presented in FIG. 15, the protruding section 23 may also be connected to the land section 14*c* in the current collector wiring 14 of an adjoining dye-sensitized solar cell 50 through an insert material 510. In this case, as illustrated in FIG. 16, an alloy section 565 formed from an alloy of the metal that constitutes the metal substrate 21 and the metal that constitutes the insert material 510 is provided between the protruding section 23 and the insert material 510. Here, as the insert material 510, it is preferable to use a material having lower resistance than the metal substrate 21 and the current collector wiring 14. In this case, when the protruding section 23 and the land section 14*c* are connected by resistance welding, it is easy to bond the protruding section 23 and the insert material 510, and it is easy to bond the insert material 510 and the current collector wiring 14. Even if the constituent materials of the metal substrate 21 and the land section 14*c* are materials that are difficult to be directly welded, when the insert material 510 that is capable of satisfactory bonding respectively to the metal substrate 21 and the land section 14*c* is interposed between the protruding section 23 and the land section 14*c*, connection reliability can be enhanced. The insert material 510 is appropriately determined depending on the materials of the metal substrate 21 and the land section 14*c*. Meanwhile, in a part of the dye-sensitized solar cells 50 among the plural dye-sensitized solar cells 50 that constitute the dye-sensitized solar cell module 500, a connection member (not illustrated in the diagram) is fixed to the metal substrate 21 of the counter electrode 20 by resistance welding. Furthermore, in the dye-sensitized solar cell module 500 illustrated in FIG. 15, a terminal section is constituted by the land section 14*c* of the current collector wiring 14 and the insert material 510.

Furthermore, in the third and fourth embodiments, the dye-sensitized solar cell modules 300 and 400 include two dye-sensitized solar cell module units 300A, 300B, but the number of the module units is not limited to 2, and the number may be 1, or even 3 or more. Furthermore, in the third and fourth embodiments, the dye-sensitized solar cell module units 300A and 300B each include four dye-sensitized solar cells 50, but the number of the dye-sensitized solar cells 50 is not limited to 4, and any plural number may be used.

Furthermore, in the third and fourth embodiments, for each of the dye-sensitized solar cell module units 300A and 300B, the directions of protrusion of the protruding sections 23 of the dye-sensitized solar cells 50 with respect to the main body section 25 are set to be the same; however, it is not necessary that the directions of protrusion be the same, and the directions of protrusion may be different from one another.

Furthermore, in regard to the third and fourth embodiments, the land sections 14*c* are included in the current collector wiring 14, and the protruding sections 23 are bonded to the land sections 14*c*; however, the land sections 14*c* may also be provided on the transparent conductive film 12. Furthermore, the land sections 14*c* can also be omitted.

Furthermore, in the third embodiment, the protruding sections 23 that protrude from a portion of the edge 25*a* of the main body section 25 of one dye-sensitized solar cell 50 between two adjoining dye-sensitized solar cells 50, and the land sections 14*c* of the current collector wiring 14 of the other dye-sensitized solar cell are connected by resistance welding. However, from the viewpoint of achieving the first object or the second object described above, it is also acceptable that the protruding sections 23 that protrude from the entirety of the edge 25*a* of the main body section 25 of one dye-sensitized solar cell 50 between two adjoining dye-sensitized solar cells 50, and the land sections 14*c* of the current collector wiring 14 of the other dye-sensitized solar cell 50 be connected by resistance welding.

Furthermore, in the third and fourth embodiments, the land sections 14*c* are included in the current collector wiring 14, and the protruding sections 23 are bonded to the land sections 14*c*. However, it is also acceptable that the land sections 14*c* be provided on the outside of the sealing section 30 as well as on the inner side of the edge on the adjoining dye-sensitized solar cell 50 side among the edges of the transparent conductive film 12.

Figure 17:
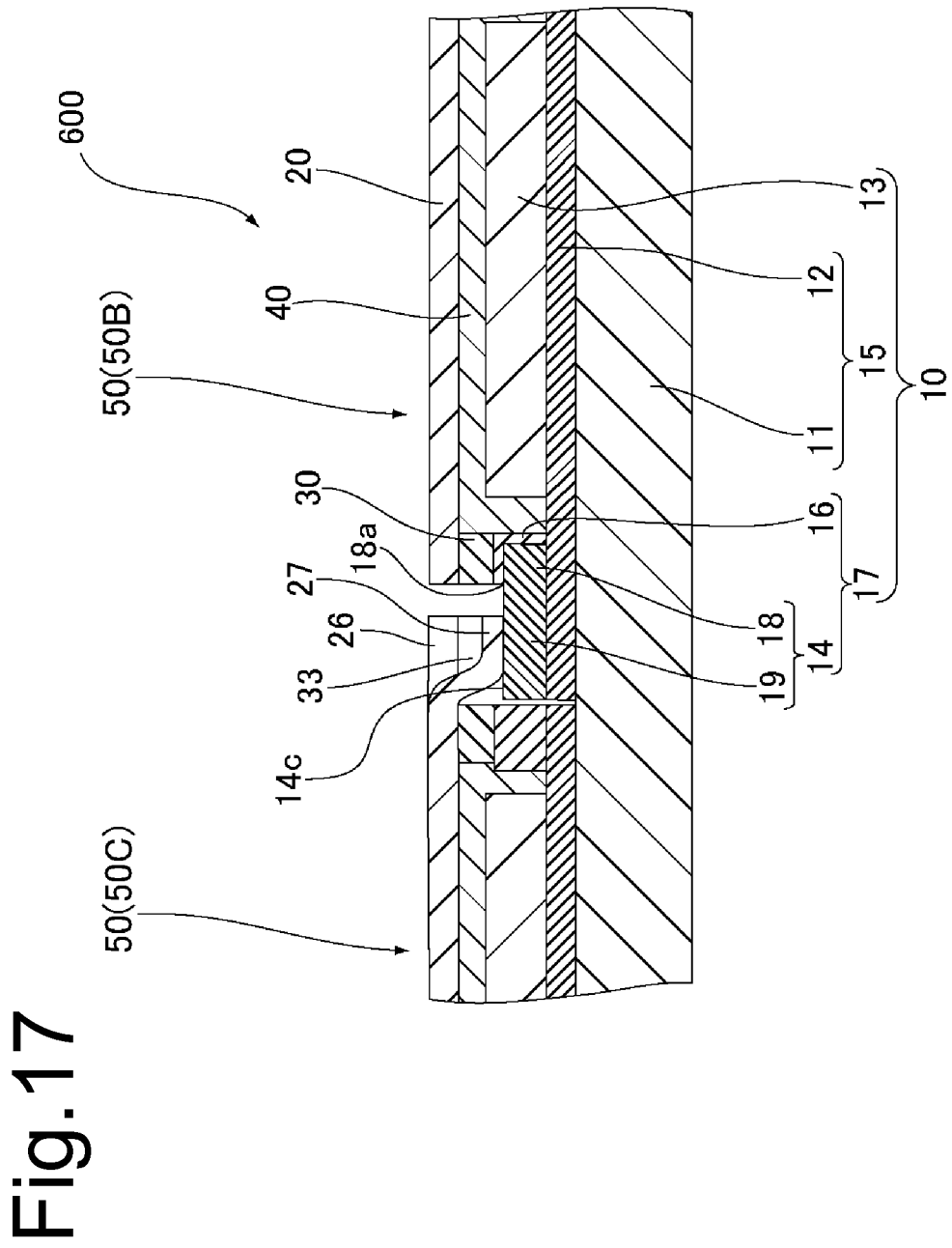
FIG. 17 is a partial cross-sectional view illustrating a sixth embodiment of the dye-sensitized solar cell module of the present invention.

Also, in the third and fourth embodiments described above, the dye-sensitized solar cell 50 includes a main body section 25 that is included in the counter electrode 20, and protruding sections 23 that protrude from an edge 25*a* of the main body section 25, and these protruding sections 23 are connected to land sections 14*c* at concave sections 33 formed by the sealing section 30 of an adjoining dye-sensitized solar cell 50. However, similarly to the dye-sensitized solar cell module 600 illustrated in FIG. 17, the current collector wiring 14 of one dye-sensitized solar cell 50 (50B) between two adjoining dye-sensitized solar cell 50 includes a main body section 18, and at least one protruding section 19 that protrudes from a portion of an edge 18*a* of the main body section 18, and these protruding sections 19 may be bonded, at a concave section 33 formed by the sealing section 30 of an adjoining dye-sensitized solar cell 50 (50C), to the counter electrode 20 of the adjoining dye-sensitized solar cell 50C. In this case, for example, if two notches 26 are formed at an edge of the counter electrode 20, the portion between the two notches 26 may sag toward the protruding section 19 side. Accordingly, it is desirable that this sagging portion 27 be bonded to the protruding section 19. In this case, superior connection reliability is obtained as compared with the case of the dye-sensitized solar cell module 300 of the third embodiment. Meanwhile, similarly to the case of the third embodiment, it is preferable that the sagging portion 27 and the protruding section 19 be bonded by resistance welding. In the present embodiment, the first electrode is constituted by the transparent conductive substrate 15, and the first electrode section is constituted by the transparent conductive substrate 15 and the current collector wiring 14.

Furthermore, in the third embodiment, from the viewpoint of achieving the second object of producing a dye-sensitized solar cell module which has excellent conductive property and connection reliability and has deterioration of the photosensitized dye sufficiently suppressed, it is not necessarily required in the dye-sensitized solar cell 50H of the dye-sensitized solar cell module unit 300B that the connection member 60 be bonded to the metal substrate 21 of the counter electrode 20. Furthermore, also in the dye-sensitized solar cell modules 500 and 600, it is not necessary that connection members be bonded to the metal substrate 21 of the counter electrode 20 in a part of the dye-sensitized solar cells 50 among the plural dye-sensitized solar cells 50.

Furthermore, in the third embodiment, from the viewpoint of achieving the third object of providing a dye-sensitized solar cell module which has a sufficiently high aperture ratio and also has excellent connection reliability, it is not necessarily required that in the dye-sensitized solar cell 50H of the dye-sensitized solar cell module unit 300B, the connection member 60 be bonded to the metal substrate 21 of the counter electrode 20. Furthermore, also in the dye-sensitized solar cell modules 500 and 600, it is not necessary that connection members be bonded to the metal substrate 21 of the counter electrode 20 in a part of the dye-sensitized solar cells 50 among the plural dye-sensitized solar cells 50.

EXAMPLES

Hereinafter, embodiments of the present invention will be more specifically described by way of Examples, but the present invention is not intended to be limited to the Examples described below.

Example 1

First, a transparent conductive substrate was prepared by forming a transparent conductive film formed of FTO and having a thickness of 1 μm, on the surface of a transparent substrate formed from a glass plate having a surface dimension of 50 mm×50 mm and a thickness of 4 mm. The transparent conductive film was subjected to patterning by etching.

Next, a paste for forming an oxide semiconductor layer (manufactured by JGC C&C Corp., PST-21NR) was applied on the transparent conductive film using a screen printing machine and dried, and this operation was repeated three times. Subsequently, a silver paste was sintered for one hour at 500° C. in an electric furnace, and thus a porous oxide semiconductor layer was formed.

Next, a commercially available silver paste for a thick film was used to apply on the transparent conductive film so as to surround the porous oxide semiconductor layer, and then the paste was dried. This process of application and drying was repeated three times using a screen printing machine. Thereafter, the paste was sintered for one hour at 500° C. in an electric furnace. Thus, a current collector wiring having a thickness of 15 μm was formed on the transparent conductive film. At this time, similarly to the current collector wiring, a terminal connected to the current collector wiring was formed on the transparent conductive film. Next, a glass paste that protects the current collector wiring was applied on the current collector wiring, and then the glass paste was dried. This process of application and drying was repeated three times, and the glass paste was sintered for one hour in an electric furnace. In this manner, a wiring protective layer having a thickness of 30 μm was formed on the current collector wiring, and thus a working electrode was obtained.

The working electrode obtained as described above was immersed in a dye solution which contained a mixed solvent of acetonitrile and tert-butanol mixed at 1:1 (volume ratio) and contained a photosensitized dye formed from a ruthenium dye (N719) at a concentration of 0.3 mM, and thus the photosensitized dye was adsorbed to the porous semiconductor layer. Subsequently, any excess photosensitized dye was washed away with the mixed solvent, and the working electrode was dried. Thereby, the photosensitized dye was adsorbed to the porous semiconductor layer.

On the other hand, the counter electrode was prepared as follows.

That is, first, a Ti plate having a thickness of 200 μm was prepared, and Pt was deposited on this Ti plate using a three-dimensional RF sputtering apparatus. Thus, a catalyst layer having a thickness of 10 nm was formed thereon. In this manner, a counter electrode was obtained.

Next, a rectangular annular resin sheet (width 2 mm, thickness 50 μm) formed of an ethylene-methacrylic acid copolymer (trade name: NUCREL, manufactured by Mitsui DuPont Polychemical Co., Ltd.) was disposed on the working electrode, and this resin sheet was fixed onto the working electrode by heating and melting the resin sheet at 150° C.

Next, a volatile electrolyte containing methoxyacetonitrile as a solvent was injected into the space that was on the working electrode and was on the inner side of the rectangular annular resin sheet.

The counter electrode was superimposed with the resin sheet while having the catalyst layer arranged to face the working electrode, and the periphery of the counter electrode and the working electrode was hot pressed. In this manner, a sealing section was formed between the counter electrode and the working electrode, and thus a dye-sensitized solar cell was obtained.

Next, on the surface of the counter electrode on the opposite side of the working electrode, a connection member formed of copper and having a thickness of 100 μm and a dimension of 20 mm×50 mm was disposed, and the connection member and the titanium foil of the counter electrode were bonded by resistance bonding. The resistance bonding was carried out by pressing two electrodes for resistance welding against the titanium foil and the connection member, respectively and applying a current of 1.0 kA between the two electrodes for resistance welding for 10 ms. At this time, the distance between the two electrodes for resistance welding was set to 5 mm.

Next, a solder formed of a Sn—Ag—Cu system was brought into contact with the connection member, melted and then cooled. In this manner, the solder was bonded to the connection member. Similarly, the solder was brought into contact with the top of the terminal, melted, and then cooled. In this manner, the solder was bonded to the terminal.

Thus, a dye-sensitized solar cell was obtained.

Three other dye-sensitized solar cells were also produced as in the same manner as the above.

Next, a lead wire was prepared, and the four dye-sensitized solar cells were connected in series by means of the lead wire. Specifically, an end of the lead wire was brought into contact with the solder while melting the solder, and the lead wire was fixed to the connection member by means of solder. Subsequently, the other end of the lead wire was brought into contact with the solder while melting the solder, and the lead wire was fixed to the terminal by means of solder. In this manner, the four dye-sensitized solar cells were connected in series, and thus a dye-sensitized solar cell module was obtained.

Examples 2 to 11

Dye-sensitized solar cell modules were produced in the same manner as in Example 2, except that the welding time for resistance welding, the thickness of the connection member, and the thickness of the counter electrode were changed as indicated in Table 1.

Comparative Example 1

A dye-sensitized solar cell module was produced in the same manner as in Example 1, except that the connection member was bonded to the titanium foil while ultrasonic vibration was applied under the conditions of a pressure of 35 N/mm$^2$ and a frequency of 40 kHz.

For the dye-sensitized solar cell modules obtained in Examples 1 to 11 and Comparative Example 1, connection reliability was investigated. For the connection reliability, a temperature cycle test as defined in JIS C8938 A-1 was carried out 200 times. Furthermore, the presence or absence of the detachment of the welded parts, which were bonding sections between the connection member and the metal substrate, was evaluated, and a dye-sensitized solar cell module which did not undergo detachment was considered acceptable.

Furthermore, for the dye-sensitized solar cell modules obtained in Examples 1 to 11 and Comparative Example 1, deterioration of the photosensitized dye was investigated. Deterioration of the photosensitized dye was judged by visually inspecting whether the color of the photosensitized dye changed between before bonding and after bonding, and in the case where obvious discoloration had occurred, it was considered that deterioration had occurred.

Next, in two adjoining dye-sensitized solar cells, an edge on the other dye-sensitized solar cell side of the counter electrode side of one dye-sensitized solar cell, and the current collector wiring of the other dye-sensitized solar cell were bonded by resistance welding. The resistance welding was carried out by pressing both two electrodes for resistance welding against the titanium foil, and applying a current of 1.0 kA between the two electrodes for resistance welding for 10 ms. At this time, the distance between the two electrodes for resistance welding was set to 1 mm.

In this manner, a dye-sensitized solar cell module composed of one dye-sensitized solar cell module unit including eight dye-sensitized solar cells was obtained.

TABLE 1

| | Method for bonding metal substrate and connection member | Welding time (ms) | Thickness of connection member (mm) | Thickness of counter electrode (mm) | Connection reliability Presence or absence of detachment of welded parts after heat cycles | Deterioration of photosensitized dye | Power generation characteristics Photoelectric conversion efficiency (%) |
|---|---|---|---|---|---|---|---|
| Example 1 | Resistance welding | 10 | 100 | 40 | No detachment | Absent | 4.1 |
| Example 2 | Resistance welding | 2 | 46 | 40 | No detachment | Absent | 4.3 |
| Example 3 | Resistance welding | 18 | 46 | 40 | No detachment | Absent | 3.5 |
| Example 4 | Resistance welding | 2 | 5 | 40 | No detachment | Absent | 3.5 |
| Example 5 | Resistance welding | 2 | 12 | 40 | No detachment | Absent | 3.6 |
| Example 6 | Resistance welding | 2 | 100 | 40 | No detachment | Absent | 3.8 |
| Example 7 | Resistance welding | 2 | 200 | 40 | No detachment | Absent | 4.0 |
| Example 8 | Resistance welding | 2 | 46 | 5 | No detachment | Absent | 3.6 |
| Example 9 | Resistance welding | 2 | 46 | 12 | No detachment | Absent | 3.8 |
| Example 10 | Resistance welding | 2 | 46 | 100 | No detachment | Absent | 4.1 |
| Example 11 | Resistance welding | 2 | 46 | 220 | No detachment | Absent | 3.6 |
| Comparative Example 1 | Ultrasonic waves | — | 46 | 40 | Detached | Present | 2.6 |

As illustrated in Table 1, it was found that the dye-sensitized solar cell modules obtained in Examples 1 to 11 had higher connection strength as compared with the dye-sensitized solar cell module of Comparative Example 1, and did not undergo detachment even after the temperature cycle test. Meanwhile, it was found that in Comparative Example 1, there was an increase in resistance, along with detachment. Furthermore, in Examples 1 to 11, deterioration of the photosensitized dye was not observed, whereas deterioration of the photosensitized dye was observed in Comparative Example 1.

In addition, the inventors of the present invention carried out the following experiment for reference.

Experiment Example A1

First, eight dye-sensitized solar cells were obtained in the same manner as in Example 1, except that a transparent substrate having a surface dimension of 500 mm×500 mm was used as the transparent substrate.

Experiment Examples A2 to A11

Dye-sensitized solar cell modules were produced in the same manner as in Experiment Example 1, except that the welding time for resistance welding, the thickness of the current collector wiring, and the thickness of the counter electrode were changed as indicated in Table 2.

For the dye-sensitized solar cell modules obtained in Experiment Examples A1 to A11, connection reliability was investigated. The connection reliability was investigated by carrying out a temperature cycle test as defined in JIS C8938 A-1 200 times. Furthermore, the presence or absence of the detachment at the bonded parts between the counter electrode and the current collector wiring of the working electrode was evaluated, and a dye-sensitized solar cell module which did not undergo detachment was considered acceptable.

Furthermore, for the dye-sensitized solar cell modules obtained in Experiment Examples A1 to A11, the photoelectric conversion characteristics were evaluated. Regarding the photoelectric conversion characteristics, an evaluation was carried out by means of pseudo-sunlight of air mass (AM) 1.5. The results are presented in Table 2. Meanwhile, the photoelectric conversion characteristics serve as an indicator of conductive property.

Furthermore, for the dye-sensitized solar cell modules obtained in Experiment Examples A1 to A11, deterioration of the dye was investigated. Deterioration of the photosensitized dye was judged by visually inspecting whether the color of the photosensitized dye changed before bonding and after bonding, and in the case where obvious discoloration had occurred, it was considered that deterioration had occurred.

and connection reliability, and having deterioration of the photosensitized dye sufficiently suppressed, can be produced.

Experiment Example B

First, a transparent conductive substrate was prepared by forming a transparent conductive film formed of FTO and

TABLE 2

| | Method for bonding counter electrode and current collector wiring | Welding time (ms) | Thickness of current collector wiring (μm) | Thickness of counter electrode (μm) | Connection reliability Presence or absence of detachment of welded parts after heat cycles | Power generation characteristics Photoelectric conversion efficiency (%) | Deterioration of photosensitized dye |
|---|---|---|---|---|---|---|---|
| Experiment Example A1 | Resistance welding | 10 | 100 | 40 | No detachment | 4.1 | Absent |
| Experiment Example A2 | Resistance welding | 4 | 20 | 40 | No detachment | 4.5 | Absent |
| Experiment Example A3 | Resistance welding | 18 | 20 | 40 | No detachment | 3.7 | Absent |
| Experiment Example A4 | Resistance welding | 4 | 5 | 40 | No detachment | 3.5 | Absent |
| Experiment Example A5 | Resistance welding | 4 | 30 | 40 | No detachment | 4.2 | Absent |
| Experiment Example A6 | Resistance welding | 4 | 50 | 40 | No detachment | 4.3 | Absent |
| Experiment Example A7 | Resistance welding | 4 | 100 | 40 | No detachment | 4.0 | Absent |
| Experiment Example A8 | Resistance welding | 4 | 20 | 5 | No detachment | 3.7 | Absent |
| Experiment Example A9 | Resistance welding | 4 | 20 | 12 | No detachment | 4.1 | Absent |
| Experiment Example A10 | Resistance welding | 4 | 20 | 100 | No detachment | 3.9 | Absent |
| Experiment Example A11 | Resistance welding | 4 | 20 | 220 | No detachment | 3.6 | Absent |

As illustrated in Table 2, the dye-sensitized solar cell modules obtained in Experiment Examples A1 to A11 were satisfactory in terms of all of conductive property, connection reliability, and the effect of preventing deterioration of the photosensitized dye.

From the above results, it was confirmed that according to a method for producing a dye-sensitized solar cell module having a dye-sensitized solar cell module unit which includes plural dye-sensitized solar cells that are electrically connected in series, the method including a preparation step of preparing plural dye-sensitized solar cells; and a connection step of electrically connecting the plural dye-sensitized solar cells in series, and thereby producing a dye-sensitized solar cell module unit, in which method in the preparation step, the dye-sensitized solar cell further includes a terminal section provided on the first electrode; one transparent substrate is used in common as a transparent substrate for plural dye-sensitized solar cells; and in the connection step, the second electrode of one dye-sensitized solar cell between two adjoining dye-sensitized solar cells, and the terminal section that is provided on the first electrode of the other dye-sensitized solar cell are connected by resistance welding, a dye-sensitized solar cell module having excellent conductive property having a thickness of 1 μm, on the surface of a transparent substrate formed from a glass plate having a surface dimension of 500 mm×500 mm and a thickness of 4 mm. The transparent conductive film was subjected to laser processing, so that rectangular regions each having a size of 234.4 mm×116.6 mm would be formed in two rows, with four rectangular regions in a row. At this time, the distance between adjoining rectangular regions was set to 1.2 mm.

Next, on each of the rectangular regions of the transparent conductive film, a paste for forming an oxide semiconductor layer containing titania was applied at 20 sites so as to obtain the pattern illustrated in FIG. 9, and dried. At this time, in order to form land sections, the paste for forming an oxide semiconductor layer was applied at four sites, with a dimension of a width of 10.8 mm×a length of 107.0 mm, and the paste for forming an oxide semiconductor layer was applied at the remaining 16 sites, with a dimension of a width of 10.8 mm×a length of 112.4 mm.

Next, the paste for forming an oxide semiconductor layer thus applied was calcined for one hour at 500° C.

Next, as illustrated in FIG. 9, a current collector wiring pattern having an outer peripheral section, partition sections that divided the opening inside the outer peripheral section, and land sections that extended toward the inner side of the outer peripheral section, was formed on the transparent conductive film. At this time, the connection terminals illustrated in FIG. 5 were also formed at the same time. Furthermore, the thickness of the current collector wiring, the width of the outer peripheral part, the width of the partition section, the length of the land section from the outer peripheral section, and the dimension of the connection terminal were respectively set as shown below.

Thickness of current collecting wiring: 0.02 mm
Width of outer peripheral section: 1.7 mm
Width of partition section: 0.3 mm
Length of land section from outer peripheral section: 7.1 mm
Dimension of connection terminal (dimension of protruding section extending from the outer peripheral section to its outside): 5.6 mm×6.6 mm In this manner, a working electrode having an oxide semiconductor layer was obtained.

Next, a sealing section was prepared. The sealing section was obtained by providing one sheet of a resin film for sealing having a size of 470 mm×470 mm×50 μm and formed of NUCREL, and forming rectangular-shaped openings in the same number as the number of the oxide semiconductor layers. At this time, each of the openings was formed such that the distance between the inner circumference of the opening and the outer circumference of the oxide semiconductor layer was 0.2 mm. In this manner, a sealing section having a width of 1.7 mm was obtained. At this time, four concave sections were formed on one edge of the sealing section, so as to expose the land sections.

Then, this sealing section was placed on the current collector wiring, and then was adhered to the current collector wiring by heating and melting the sealing section.

Next, the working electrode was immersed for one whole day and night in a dye solution which included acetonitrile and tert-butanol and contained a photosensitized dye formed from N719 at a concentration of 0.3 mM, and then the working electrode was removed and dried. Thereby, the photosensitized dye was supported on the oxide semiconductor layer.

Next, eight sheets of counter electrodes were prepared. Each of the counter electrodes was produced as follows. That is, first, a titanium foil having a size of 234.4 mm×122.2 mm×40 μm was prepared, and a catalyst layer formed of platinum and having a thickness of 100 nm was formed on the titanium foil by a sputtering method. In this manner, a laminate for counter electrode was prepared.

Next, this laminate for counter electrode was processed by laser cutting so as to obtain a shape in which, as illustrated in FIG. 5, four protruding sections protruded from a long edge of the rectangular-shaped main body section, and four cut-outs were formed on the long edge on the opposite side. At this time, the dimensions of the main body section, protruding section, and cut-out were respectively set as follows.

Main body section: long edge 234.4 mm, short edge 116.6 mm
Protruding section: width 6.6 mm, length from the long edge of the main body section to the tip 5.6 mm
Notch: width 9.0 mm, length from the long edge of the main body section to the bottom of the cut-out 5.4 mm Next, the eight sheets of counter electrodes obtained in this manner were respectively bonded so as to block the openings of the sealing section. At this time, the protruding sections were arranged to face the land sections of adjacent working electrodes, and the cut-outs of the counter electrodes were arranged to face the land sections of the working electrodes to which the counter electrodes were bonded.

The protruding sections of the counter electrodes were bonded to the land sections in the current collector wiring of adjoining dye-sensitized solar cells by resistance welding. Resistance welding was carried out by bringing one electrode between the two electrodes into contact with the current collector wiring, pressing the other electrode against the top of the protruding section, and applying a current of 1 kA for 10 ms.

In this manner, as illustrated in FIG. 5, two rows of dye-sensitized solar cell module units 300A and 300B, in each of which four dye-sensitized solar cells were connected in series, were obtained.

Next, a Cu tape formed of Cu and having a dimension of 416 mm×10 mm×100 μm was prepared, and an end of this Cu tape was connected to the connection terminal 370 of the dye-sensitized solar cell 50E, while the other end of the Cu tape was connected to the protruding section 23 of the counter electrode of the dye-sensitized solar cell 50D by resistance welding. In this manner, a dye-sensitized solar cell module was obtained. The resistance welding at this time was carried out under the same conditions as those used for the resistance welding of the protruding sections of the counter electrode and the land sections in the current collector wiring of an adjoining dye-sensitized solar cell.

For the dye-sensitized solar cell module obtained in Experiment Example B, the aperture ratio was measured. The results are presented in Table 3. Meanwhile, if the aperture ratio was 85% or higher, it was considered acceptable, and if the aperture ratio was lower than 85%, it was considered unacceptable.

TABLE 3

| | Presence or absence of protruding section of counter electrode | Presence or absence of land section of working electrode | Aperture ratio (%) | Connection reliability Presence or absence of detachment of welded parts after heat cycles |
|---|---|---|---|---|
| Experiment Example B | Present | Present | 85.8 | No detachment |

Furthermore, for the dye-sensitized solar cell module of Experiment Example B, connection reliability was investigated. The connection reliability was evaluated by performing a temperature cycle test as defined in JIS C8938 A-1 for 200 times. The results are presented in Table 3. Meanwhile, the presence or absence of detachment of welded parts, which were bonded parts between the protruding sections and the land sections, was designated as an evaluation item, and if no detachment occurred, it was considered acceptable.

As shown in Table 3, the dye-sensitized solar cell module obtained in Experiment Example B satisfied the acceptance criteria for both the aperture ratio and the connection reliability.

From the results described above, it was confirmed that a dye-sensitized solar cell module including a dye-sensitized solar cell module unit which includes plural dye-sensitized solar cells that are electrically connected in series, in which module one transparent substrate is used in common as the transparent substrate for the plural dye-sensitized solar cells; a concave section is provided on the outside of the sealing section; in two adjoining dye-sensitized solar cells, any one electrode section between a first electrode section that includes the first electrode of one dye-sensitized solar cell and a second electrode section that includes the second electrode of the dye-sensitized solar cell, includes a main body section, and at least one protruding section that is in conduction with the main body section and protrudes from a portion of the edge on the other dye-sensitized solar cell side in the main body section; and the protruding section is bonded, at the concave section of the other dye-sensitized solar cell, to the other electrode section between the first electrode section and the second electrode section of the other dye-sensitized solar cell, has a sufficiently high aperture ratio and also exhibits excellent connection reliability.

EXPLANATIONS OF REFERENCE NUMERALS

10 WORKING ELECTRODE
11 TRANSPARENT SUBSTRATE
12 TRANSPARENT CONDUCTIVE FILM
13 OXIDE SEMICONDUCTOR LAYER
14 CURRENT COLLECTOR WIRING (FIRST ELECTRODE SECTION)
14c LAND SECTION (TERMINAL SECTION)
15 TRANSPARENT CONDUCTIVE SUBSTRATE (FIRST ELECTRODE, FIRST ELECTRODE SECTION)
20 COUNTER ELECTRODE (SECOND ELECTRODE, SECOND ELECTRODE SECTION)
20a AREA THAT FACES ELECTROLYTE IN COUNTER ELECTRODE
21 METAL SUBSTRATE
23 PROTRUDING SECTION
30 SEALING SECTION
50, 50A to 50H DYE-SENSITIZED SOLAR CELL
60, 260, 460 CONNECTION MEMBER (SECOND ELECTRODE SECTION)
65, 365, 465, 565 ALLOY SECTION
300A, 300B DYE-SENSITIZED SOLAR CELL MODULE UNIT
100, 200, 300, 400, 500, 600 DYE-SENSITIZED SOLAR CELL MODULE
510 INSERT MATERIAL (TERMINAL SECTION)

The invention claimed is:

1. A dye-sensitized solar cell comprising:
a first electrode comprising a transparent substrate and a transparent conductive film that is provided on the transparent substrate;
a second electrode that faces the first electrode and comprises a metal substrate formed of a metal capable of forming a passivation film;
an oxide semiconductive layer that is provided on the first electrode or the second electrode;
an electrolyte that is provided between the first electrode and the second electrode;
a sealing section that bonds the first electrode and the second electrode; and
a connection member that is provided on the surface of the second electrode on the opposite side of the first electrode and is formed of a metal having lower resistance than the metal that constitutes the metal substrate,
wherein an alloy section formed from an alloy of the metal that constitutes the metal substrate and the metal that constitutes the connection member, is provided between the second electrode and the connection member.

2. The dye-sensitized solar cell according to claim 1, wherein the connection member is provided in an area on the second metal that faces the electrolyte.

3. A dye-sensitized solar cell module comprising a dye-sensitized solar cell module unit which comprises plural dye-sensitized solar cells that are electrically connected in series, at least a part of the dye-sensitized solar cells among the plural dye-sensitized solar cells being constituted of the dye-sensitized solar cell according to claim 1,
wherein the dye-sensitized solar cell further comprises a terminal section that is provided on the first electrode,
one transparent substrate is used in common as the transparent substrate for the plural dye-sensitized solar cells,
the metal substrate of the second electrode of one dye-sensitized solar cell between two adjoining dye-sensitized solar cells, and the terminal section that is provided on the first electrode of the other dye-sensitized solar cell, are directly connected,
the area that is in contact with the metal substrate in the terminal section is formed of a metal having lower resistance than the metal substrate of the second electrode, and
an alloy section formed from an alloy of the metal that constitutes the metal substrate and the metal that constitutes the area that is in contact with the metal substrate in the terminal section, is provided between the terminal section and the second electrode.

4. A dye-sensitized solar cell module comprising a dye-sensitized solar cell module unit which comprises plural dye-sensitized solar cells that are electrically connected in series,
at least a part of the dye-sensitized solar cells among the plural dye-sensitized solar cells being constituted of the dye-sensitized solar cell according to claim 1,
wherein the dye-sensitized solar cell further comprises a terminal section that is provided on the first electrode,
one transparent substrate is used in common as the transparent substrate for the plural dye-sensitized solar cells,
the connection member that is fixed to the second electrode of one dye-sensitized solar cell between two adjoining dye-sensitized solar cells, and the terminal section that is provided on the first electrode of the other dye-sensitized solar cell, are directly connected, and
an alloy section formed from an alloy of the metal that constitutes the area that is in contact with the connection member in the terminal section and the metal that constitutes the connection member, is provided between the terminal section and the connection member.

5. A dye-sensitized solar cell module comprising a dye-sensitized solar cell module unit which comprises plural dye-sensitized solar cells that are electrically connected in series,
wherein at least a part of the dye-sensitized solar cells among the plural dye-sensitized solar cells being constituted of the dye-sensitized solar cell according to claim 1,
one transparent substrate is used in common as the transparent substrate for the plural dye-sensitized solar cells,
each of the plural dye-sensitized solar cells comprises a first electrode section including the first electrode and a second electrode section including the second electrode,
a concave section is provided on the outside of the sealing section,
in two adjoining dye-sensitized solar cells, any one electrode section between the first electrode section and the second electrode section of one dye-sensitized solar cell comprises a main body section, and at least one protruding section that is in conduction with the main body section and protrudes from at least a portion of the edge on the other dye-sensitized solar cell side in the main body section, and
the protruding section is bonded, at the concave section of the other dye-sensitized solar cell, to other electrode section between the first electrode section and the second electrode section of the other dye-sensitized solar cell.

* * * * *